(12) United States Patent
Goethals et al.

(10) Patent No.: US 10,599,785 B2
(45) Date of Patent: Mar. 24, 2020

(54) SMART SOUND DEVICES AND LANGUAGE TRANSLATION SYSTEM

(71) Applicant: Waverly Labs Inc., Brooklyn, NY (US)

(72) Inventors: William O. Goethals, Brooklyn, NY (US); Jainam Shah, New York, NY (US); Benjamin J. Carlson, Medford, MA (US)

(73) Assignee: WAVERLY LABS INC., Brooklyn, NY (US)

(*) Notice: Subject to any disclaimer, the term of this patent is extended or adjusted under 35 U.S.C. 154(b) by 0 days.

(21) Appl. No.: 15/976,261

(22) Filed: May 10, 2018

(65) Prior Publication Data

US 2018/0329896 A1    Nov. 15, 2018

Related U.S. Application Data

(60) Provisional application No. 62/504,735, filed on May 11, 2017.

(51) Int. Cl.
*G06F 17/28* (2006.01)
*H04R 1/08* (2006.01)
(Continued)

(52) U.S. Cl.
CPC ............ *G06F 17/289* (2013.01); *G10L 13/00* (2013.01); *G10L 15/00* (2013.01); *H04R 1/08* (2013.01); *H04R 1/1016* (2013.01)

(58) Field of Classification Search
USPC ...................................................... 704/2–10
See application file for complete search history.

(56) References Cited

U.S. PATENT DOCUMENTS 8,527,258 B2 * 9/2013 Kim ..................... G10L 15/26
                                                            704/2
8,548,814 B2   10/2013 Manuel-Devadoss
(Continued)

OTHER PUBLICATIONS

International Search Report and Written Opinion dated Nov. 12, 2018, issued in Application PCT/US2018/032086.
Written Opinion dated May 3, 2019, issued in PCT Application No. PCT/US2018/032086.

*Primary Examiner* — Leonard Saint Cyr
(74) *Attorney, Agent, or Firm* — Fox Rothschild LLP

(57) ABSTRACT

A system includes a plurality of sound devices, an electronic device having a serial port emulator configured to generate a serial port emulation corresponding to each of the plurality of sound devices, and a computer-readable storage medium having one or more programming instructions. The system receives compressed and encoded sound input from a first sound device via a serial port emulation associated with the first sound device. The sound input is associated with a first language. The system decodes and decompresses the compressed and encoded sound input to generate decompressed and decoded sound input, generates sound output by translating the decompressed and decoded sound input from the first language to a second language, compresses and encodes the sound output to generate compressed and encoded sound output, and transmits the compressed and encoded sound output to a second sound device via a serial port emulation associated with the second sound device.

19 Claims, 18 Drawing Sheets

(51) Int. Cl.
*H04R 1/10* (2006.01)
*G10L 13/00* (2006.01)
*G10L 15/00* (2013.01)

(56) References Cited

U.S. PATENT DOCUMENTS

| | | | |
|---|---|---|---|
| 2003/0158722 A1* | 8/2003 | Lord | G06F 17/289 |
| | | | 704/3 |
| 2006/0190250 A1* | 8/2006 | Saindon | G06F 17/28 |
| | | | 704/235 |
| 2007/0111756 A1* | 5/2007 | Reed | H04L 51/38 |
| | | | 455/556.1 |
| 2008/0233877 A1 | 9/2008 | Gwee | |
| 2008/0233980 A1* | 9/2008 | Englund | G06F 17/289 |
| | | | 455/466 |
| 2009/0099836 A1* | 4/2009 | Jacobsen | G06F 17/289 |
| | | | 704/3 |
| 2009/0171653 A1* | 7/2009 | Hecht | G06F 17/2809 |
| | | | 704/3 |
| 2010/0235161 A1* | 9/2010 | Kim | G10L 13/00 |
| | | | 704/3 |
| 2011/0238405 A1 | 9/2011 | Pedre | |
| 2012/0147740 A1* | 6/2012 | Nakash | H04L 12/437 |
| | | | 370/221 |
| 2014/0080407 A1 | 3/2014 | Jang | |
| 2016/0147740 A1 | 5/2016 | Gao et al. | |
| 2016/0269523 A1 | 9/2016 | Hardi | |

\* cited by examiner

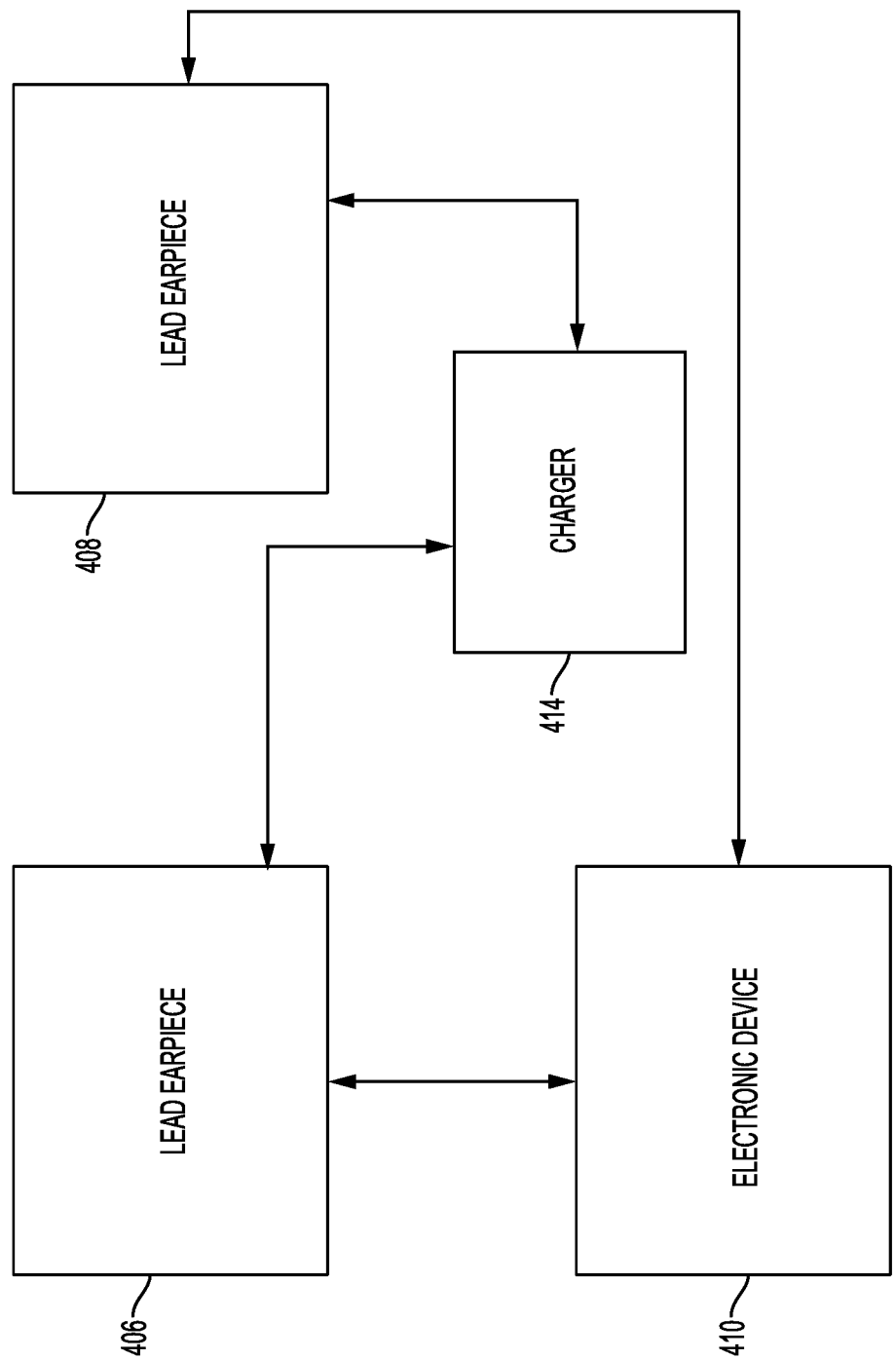

SMART SOUND DEVICES AND LANGUAGE TRANSLATION SYSTEM

RELATED APPLICATIONS AND CLAIM OF PRIORITY

This patent document claims priority to U.S. provisional patent application No. 62/504,735, filed May 11, 2017. The disclosure of this priority document is fully incorporated into this document by reference.

BACKGROUND

Clear and effective communication is often difficult between speakers of different languages. Currently, at least 6,500 spoken languages exist, and language barriers create obstacles to meaningful interactions between native speakers and non-native speakers. Translation technologies exist, but often these systems are error prone, inefficient and/or lacking in audio quality. Slow and inaccurate translation has the potential for disrupting the flow, tone and dynamic of a conversation as the sharing of ideas is hindered by waiting for an accurate translation. Moreover, current translation technologies are often meant to be one-on-one solutions, and do not efficiently support group conversations.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system includes a plurality of sound devices, an electronic device having a serial port emulator configured to generate a serial port emulation corresponding to each of the plurality of sound devices, and a computer-readable storage medium having one or more programming instructions that, when executed, cause the electronic device to perform certain actions. The system receives, via a receiver of the electronic device, compressed and encoded sound input from a first sound device via a serial port emulation associated with the first sound device. The first sound device is from the plurality of sound devices, and the sound input is associated with a first language. The system decodes and decompresses the compressed and encoded sound input to generate decompressed and decoded sound input, generates sound output by translating the decompressed and decoded sound input from the first language to a second language, compresses and encodes the sound output to generate compressed and encoded sound output, and transmits, via a transmitter of the electronic device, the compressed and encoded sound output to a second sound device via a serial port emulation associated with the second sound device.

At least a portion of the decompressed and decoded sound input may be captured by one or more microphones of the first sound device.

In an embodiment, the second sound device may be configured to receive the compressed and encoded sound output, decode and decompress the compressed and encoded sound output to generate decompressed and decoded sound output, and output at least a portion of the decompressed and decoded sound output via one or more speakers of the second sound device.

Optionally, one or more of the first sound device or the second sound device may be an earpiece.

In an embodiment, the system may send at least the portion of the decompressed and decoded sound input to a remote server for translation, and receive the sound output from the remote server. The system may identify a first setting indicating that a native language is the first language, and identify a second setting indicating that a target language is the second language. The first setting and second setting may be specified by a user via the electronic device.

The system may transmit the compressed and encoded sound output directly to the second sound device. Alternatively, the system may transmit the compressed and encoded sound output indirectly to the second sound device via the first sound device.

In an embodiment, the system may generate a transcript of one or more of the decompressed and decoded sound input or the sound output, where the transcript includes text representations of the one or more of the decompressed and decoded sound input or the sound output. The system may present at least a portion of the transcript via a graphical user interface of the electronic device.

The system may receive, from a transmitter of the second sound device via the serial port emulation associated with the second sound device, compressed and encoded second sound input of the second language, decode and decompress the compressed and encoded second sound input to generate decompressed and decoded second sound input, translate at least a portion of the decompressed and decoded second sound input to generate second sound output, compress and encode the second sound output to generate compressed and encoded second sound output, and transmit, by the transmitter of the electronic device, the compressed and encoded second sound output to the first sound device via the serial port emulation associated with the first sound device for output by the first sound device.

BRIEF DESCRIPTION OF THE DRAWINGS

FIGS. 4A and 4B illustrate diagrams showing communication between two earpieces and an electronic device when the system operates in stereo mode according to various embodiments.

DETAILED DESCRIPTION

Figure 1A:
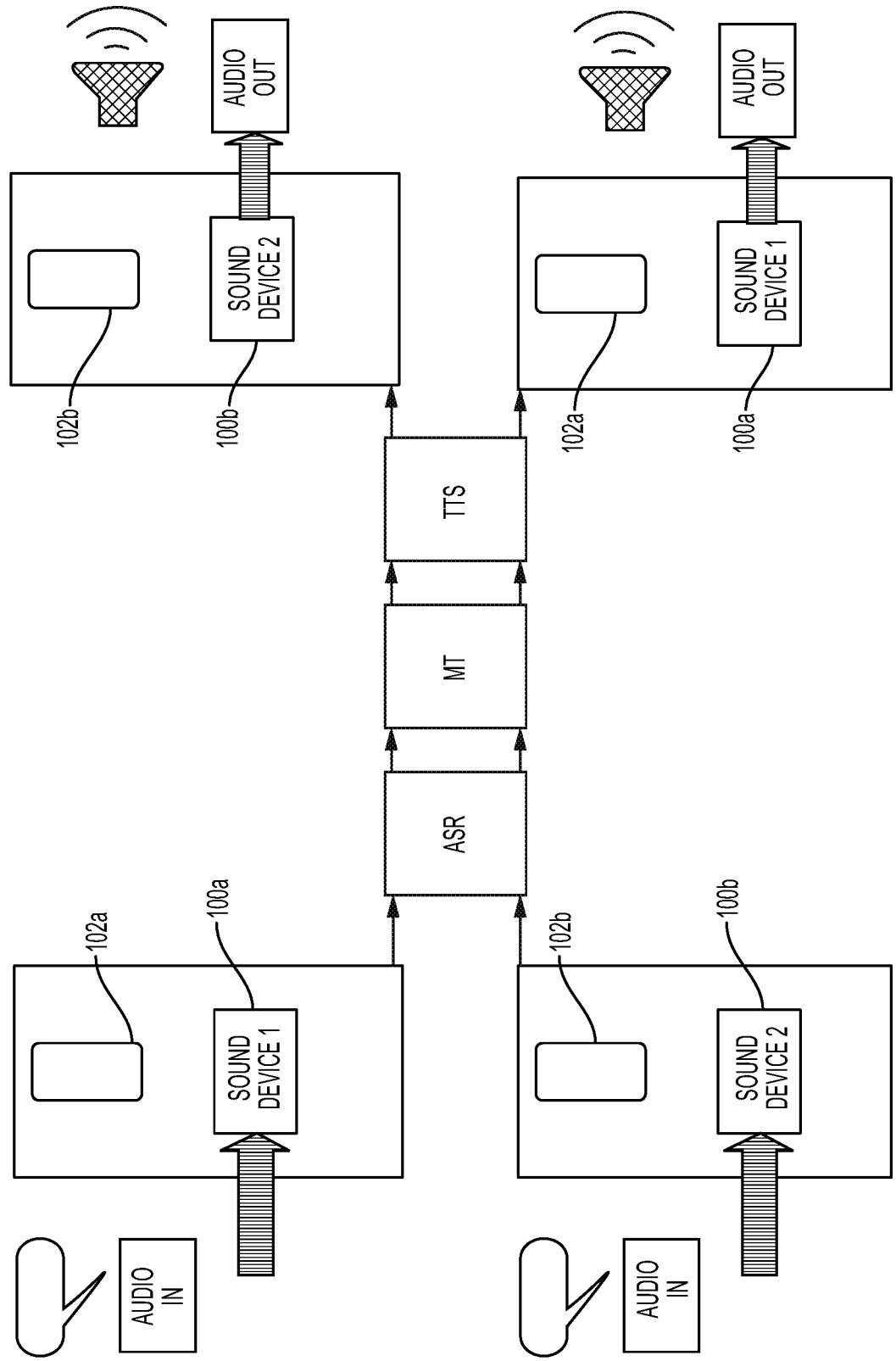
FIG. 1A illustrates an example system diagram according to an embodiment.

The following terms shall have, for purposes of this application, the respective meanings set forth below:

"Digital data" refers to any content that can be delivered in an uncompressed or compressed digital format. Examples of digital data may include, without limitation, video or other visual media content, sound input, sound output, other audio content and/or the like.

An "earpiece" refers to a type of sound device that is configured to be worn by an individual. An earpiece may be an in-ear device that fits within at least a portion of a user's ear. Alternatively, an earpiece may be an on-ear device that covers at least a portion of a user's ear, such as a headset, headphones, an over-ear device and/or the like.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers (local or cloud-based), mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

"Sound input" refers to sound waves or sound energy received by one or more microphones of for example, a sound device, such as an earpiece. Examples of sound input may be speech, music, audio, and/or the like.

"Sound output" refers to content that is delivered in a digital audio format (compressed or uncompressed). Examples of sound output include, without limitation, media, speech, music, messages, notifications, and/or the like.

A "sound device" refers to a device that outputs sound output to a user. A sound device may include one or more speakers. A sound device may also capture sound input via one or more microphones. A sound device may be a wireless device or a wired device. In various embodiments, a sound device may be an example of an electronic device.

This disclosure describes a system of delivering digital data to one or more electronic devices. An electronic device, such as a mobile phone or tablet, may include an application that controls the transmission of data, such as audio data, to and from one or more other electronic devices such as, for example, sound devices. An electronic device may include a physical serial communication port and a serial port emulator. The serial port emulator may generate a serial port emulation of the physical serial communication protocol for each sound device with which the electronic device communicates. For example, a Bluetooth serial port emulation for multiple devices may be generated on an electronic device. Multiple profiles may be created with changes to the logical link control and adaptation protocol (L2CAP). In various embodiments, multiple serial port emulations may be supported, and the electronic device may control time multiplexing between the different ports. As such, in an embodiment, an electronic device may communicate with multiple different sound devices via the serial port emulations.

L2CAP may be used with a Bluetooth protocol stack, and may support multiplexing data between different protocols and transmission of data to and from Bluetooth devices. This disclosure describes modifying the L2CAP protocol based on the number of devices in a system, and routing data to the radio frequency communication (RFCOMM) protocol. The RFCOMMM protocol is a set of transport protocols made on top of the L2CAP protocol which provides emulated ports for a Bluetooth-enabled device.

Unlike mesh networking, the controlling data exchange may be controlled from the application resident on an electronic device and the firmware of the connected electronic devices, and not the Bluetooth protocol. As such, transmission and communication between an electronic device and one or more other electronic devices may not be subject to the protocol restrictions of the Bluetooth protocol or limits of the hardware applications of the Bluetooth protocol. Moreover, this configuration supports duplex streaming between devices, such as between an electronic device and one or more sound devices. For instance, this configuration may permit the communication of data from an electronic device to a sound device, and from a sound device to an electronic device, for each emulation.

In certain embodiments, this involves delivering audio data to one or more sound devices. For example, a system may include a set of two earpieces, which are capable of providing sound output to a user. An earpiece can stand alone, receive sound output from an electronic device, such as a mobile phone, and send sound input received by one or more microphones of the earpiece to an electronic device. Two earpieces can interact with an electronic device to act as a stereo system to a user. In addition, one or more earpieces can be used in conjunction with a translation application to facilitate language translation. Moreover, earpieces may be used to facilitate group conversations, such as conversations amongst speakers of two or more languages.

The systems described in this disclosure have various applications. Users of the system(s) may include, without limitation:
- International professionals for travel, translation, interactions abroad or working with foreign clients or team members;
- Emergency personnel working with non-native language speakers;
- Students, travelers, and explorers of all ages trying to contact or connect with individuals with a language background dissimilar to their own;
- Organizations deploying employees or programs that require communication across language barriers; and
- Casual users wanting to wirelessly stream audio content.

FIG. 1A illustrates an example system overview according to various embodiments. As illustrated by FIG. 1A, a system may include one or more sound devices 100a, 100b and one or more electronic devices 102a, 102b. Sound input may be received by one or more of the sound devices 100a, 100b. The sound input may be processed by a software application resident on an associated electronic device (e.g., 102a, 102b) and/or by firmware of the sound devices 100a, 100b. As shown in FIG. 1A, this processing may include automatic speech recognition (ASR), machine translation (MT), text-to-speech translation (TTS) processing and/or the like. Additional and/or alternate types of processing may be used within the scope of this disclosure. The sound output that results from the processing may be provided to the sound devices 100a, 100b for output.

Figure 1B:
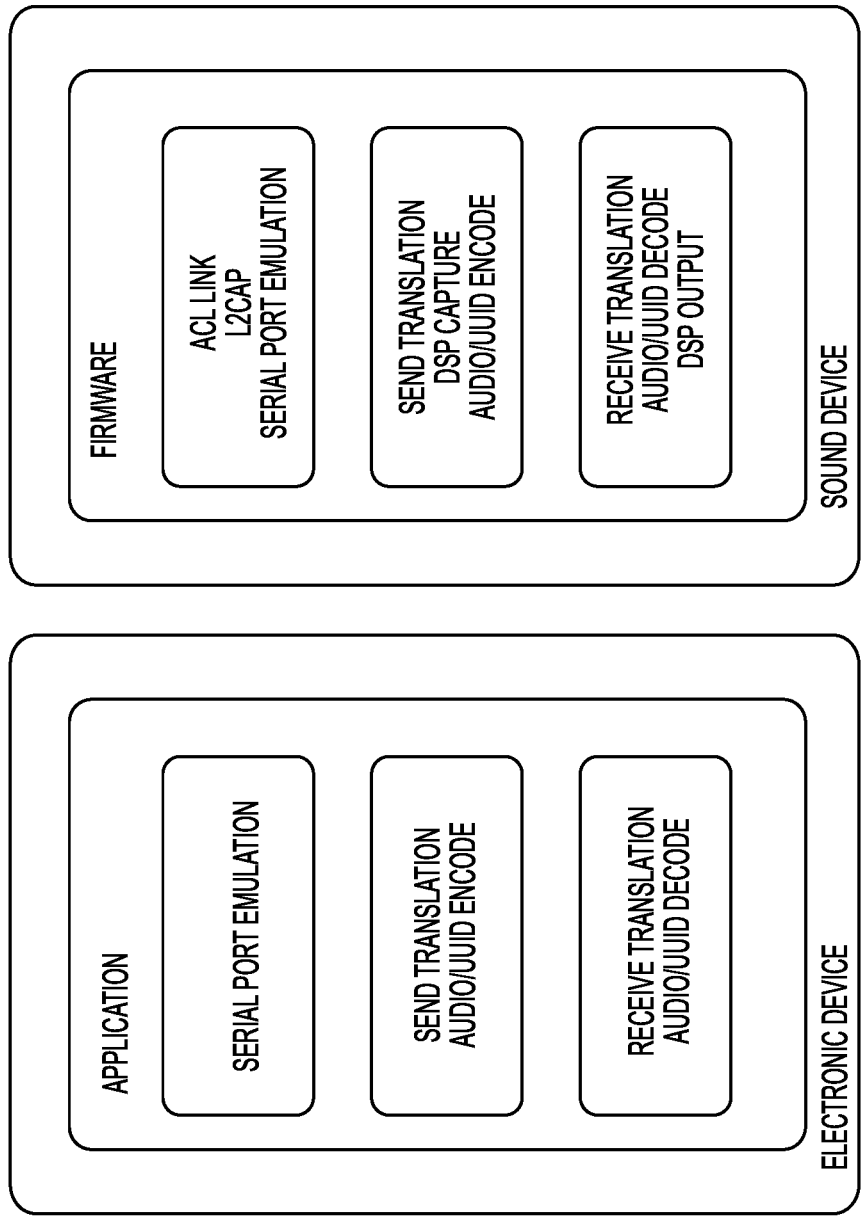
FIG. 1B illustrates example software/firmware applications for an electronic device and a sound device according to various embodiments.

FIG. 1B illustrates example software/firmware interfaces for an electronic device and a sound device according to various embodiments. As illustrated by FIG. 1B, an electronic device may include an encoder, a decoder and/or an RFCOMM listener application. A sound device may include an encoder, a decoder, a Bluetooth driver, and/or a firmware specific application. A sound device may be associated with a unique identifier, such as, for example, a universally unique identifier (UUID).

Figure 2:
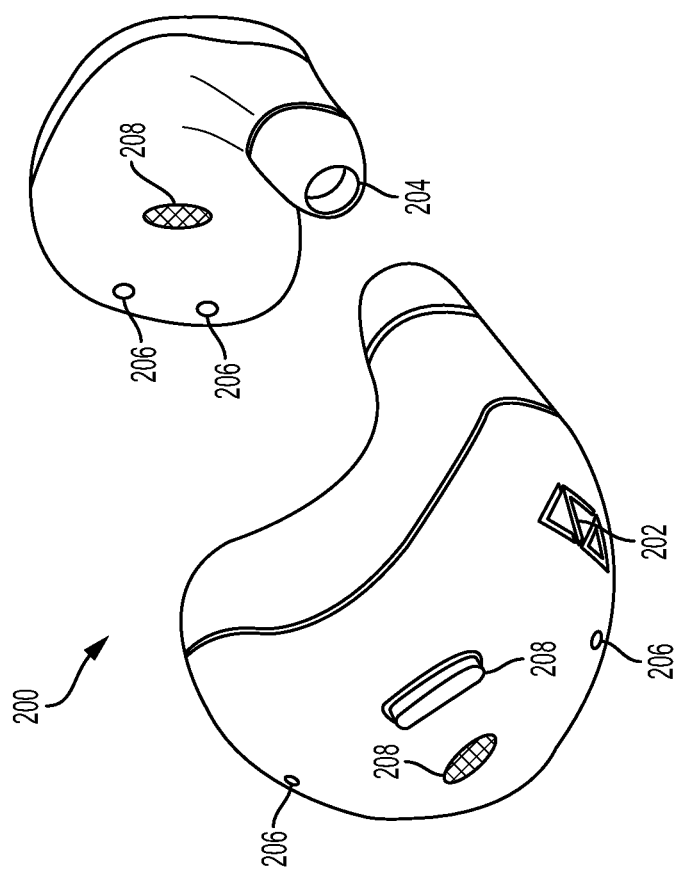
FIG. 2 illustrates a representation of example external components of an earpiece according to an embodiment.

FIG. 2 illustrates example external components of an earpiece according to an embodiment. As illustrated by FIG. 2, an earpiece 200 includes a speaker 204 and one or more microphones 206, such as, for example, far field microphones. An earpiece 200 may include one or more LEDs 202. The LEDs 202 may be battery level indicators and/or functional indicators. For example, illumination of one or more LEDs may indicate the protocol being used or the function being performed. For instance, illumination of an LED may indicate that music is playing and therefore that the Advanced Audio Distribution Bluetooth (A2DP) profile is being utilized. As another example, illumination of an LED may indicate that a phone call is in progress and therefore that the hands free protocol (HFP) is being utilized. Additional and/or alternate profiles may be used within the scope of this disclosure.

In an embodiment, an earpiece may include one or more sensors 208. A sensor 208 may be an electrical or mechanical sensor. Examples of sensors 208 may include, without limitation, a button, a capacitive touch sensor or an accelerometer. Another example of a sensor is an optical, proximity or infrared sensor which may detect if it is at least partially obstructed, such as, for example, by a finger or the presence of a user during operation. For instance, a sensor may detect whether an earpiece is physically in a user's ear. A sensor 208 may be used to perform one or more actions with respect to sound output or sound input. For example, engaging a sensor 208 may cause sound output to be paused. Alternatively, engaging a sensor 208 may cause sound input to be transmitted to another earpiece or electronic device. Additional and/or alternate actions may be used within the scope of this disclosure.

Figure 3:
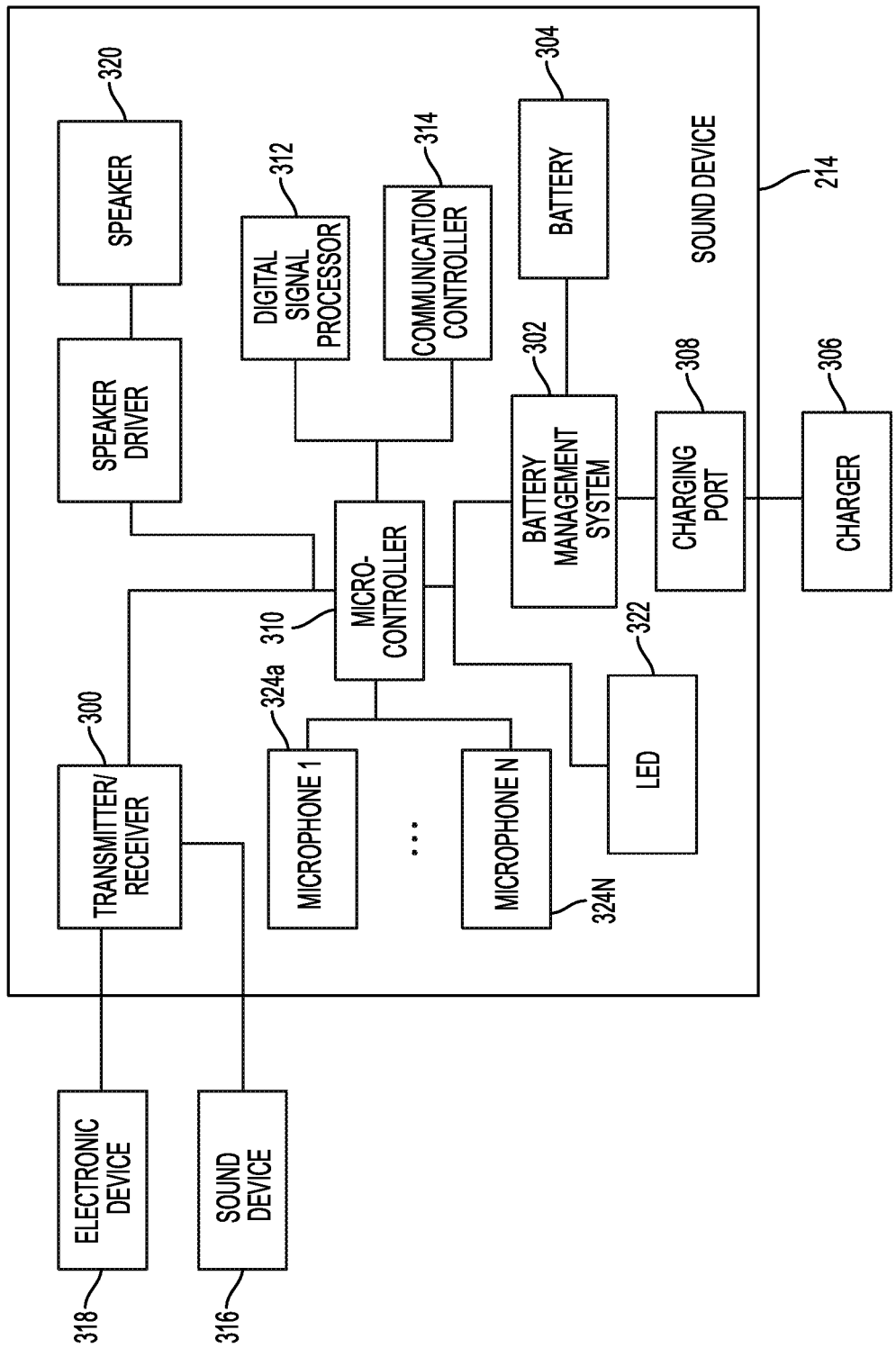
FIG. 3 illustrates a representation of example internal components of a sound device according to an embodiment.

FIG. 3 illustrates a representation of example internal components of a sound device, such as, for example, an earpiece according to an embodiment. As shown by FIG. 3, a sound device 314 may include a transmitter/receiver 300, such as, for example a Bluetooth antenna, a Bluetooth low energy interface or integrated chip, a Bluetooth controller or integrated chip, Wi-Fi, or other wireless interface. As another example, a transmitter/receiver may be a wireless chip that facilitates Wi-Fi communication between a sound device and one or more other electronic devices. A sound device may include a battery management system 302 that manages a rechargeable battery 304 that is charged by a charger 306 via a charging port 308.

A sound device may include a microcontroller 310. A microcontroller may be implemented as a system-on-chip (SoC). In addition, an earpiece may utilize hardware or software based noise cancellation technology to reduce unwanted ambient noise and sounds.

In various embodiments, a sound device may include a digital signal processor 312. A digital signal processor (DSP) 312 may be a standalone component of a sound device, or it may be implemented as part of a microcontroller 310. A DSP is used to measure, filter, compress, decompress, and/or multiplex analog signals. For example, a DSP may be used to perform noise cancellation. In certain embodiments, a digital signal controller (DSC) may be used in place of a microcontroller and a DSP. As illustrated by FIG. 3, a sound device may include a speaker 320, one or more LEDs 322, and/or one or more microphones 324a-N.

A sound device, such as one illustrated by FIG. 2 or FIG. 3, may communicate with one or more electronic devices, such as, for example, mobile electronic devices, servers (local or cloud-based), other sound devices and/or the like. A sound device may communicate wirelessly with one or more electronic devices using near-field communication capabilities, such as, for example, using Bluetooth, Bluetooth low energy and/or the like. In various embodiments, a sound device may communicate wirelessly with one or more electronic devices via a communication network such as, for example, a local area network (LAN), a wide area network (WAN), a mobile or cellular communication network, an extranet, an intranet, the Internet and/or the like. In certain embodiments, a sound device may communicate with one or more electronic devices via a wired connection.

A sound device may communicate with one or more applications. For example, an electronic device, such as a mobile phone, may include, store or utilize one or more applications. A sound device may communicate with one or more such applications over one or more networks. For example, a sound device may communicate charging or battery level data to an electronic device. As another example, an electronic device may provide a sound device with one or more firmware updates.

In various embodiments, a sound device may communicate with one or more other sound devices. For instance, FIG. 3, illustrates sound device 314 in communication with sound device 316. Sound device 316 may communicate with sound device 314 and/or electronic device 318 via one or more communication networks.

Figure 4A:
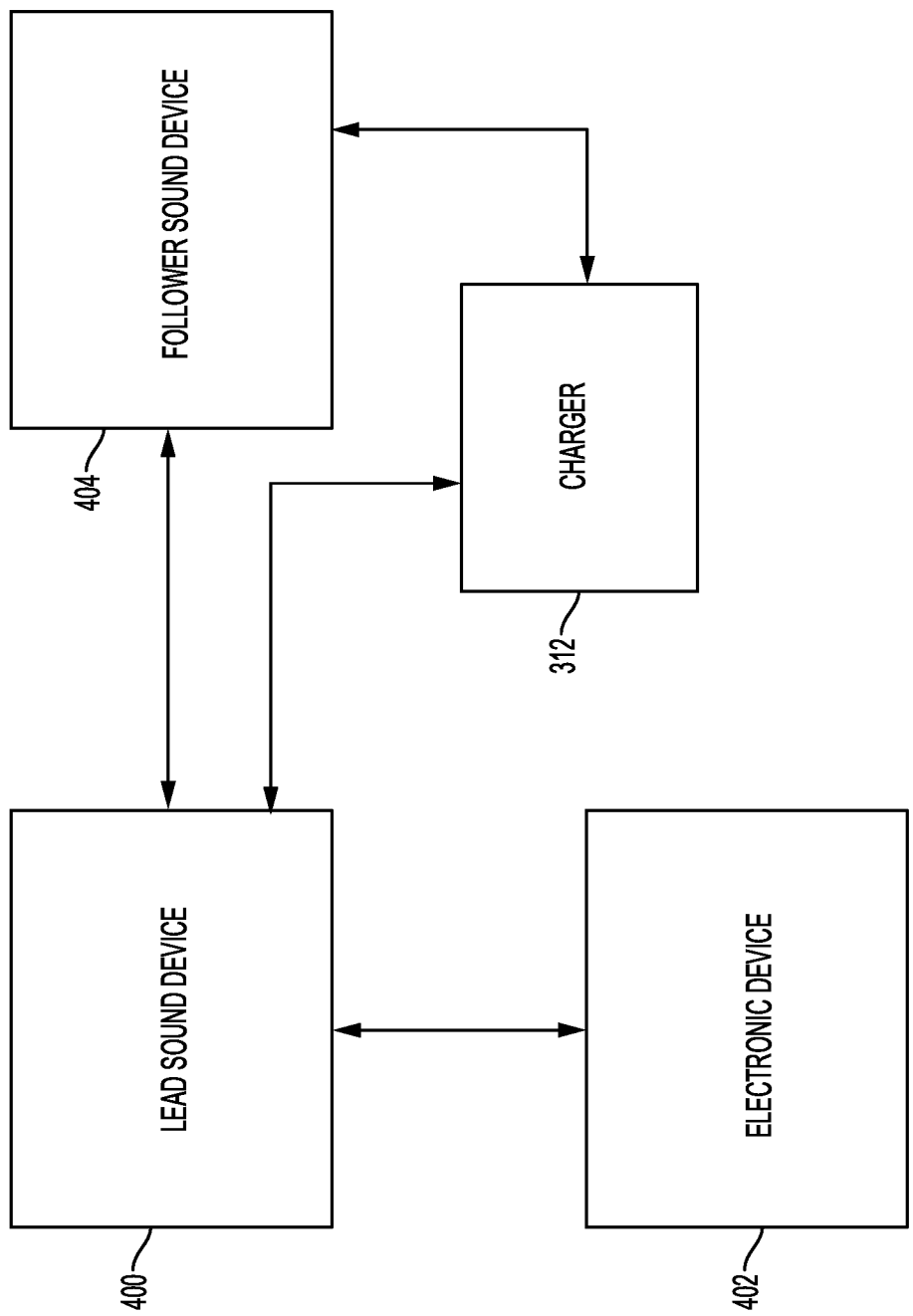

Communication between two or more sound devices may be part of a lead/follower relationship. FIG. 4A illustrates a diagram showing communication between two sound devices and an electronic device when the system operates in stereo mode. In stereo mode, the sound devices operate as a stereo system for a user, delivering sound output via the sound devices, such as, for example, music or other content.

As illustrated by FIG. 4A, while operating in stereo mode, two sound devices, such as two earpieces, may have a lead/follower relationship. A lead sound device 400 communicates with both an electronic device 402 and a follower sound device 404. The electronic device 402 may transmit to the lead sound device 400 firmware or firmware updates, sound input, control lines and/or other information. The lead sound device 400 may send to the electronic device 402 charging or battery level data, sound output received from one or more microphones, one or more acknowledgements and/or other information. As shown in FIG. 4A, a charger 412 may be used to charge the battery of one or more of the sound devices 400, 404.

As FIG. 4A shows, the follower sound device 404 is not in direct communication with the electronic device 402. Rather the follower sound device 404 only communicates with the lead sound device 400. The follower sound device 404 may transmit information to the lead sound device 400, such as charging or battery level data and/or one or more acknowledgements. Similarly, the follower sound device 404 may receive information from the lead sound device 400, such as sound input, control lines, firmware or firmware updates and/or the like. As such, when operating in stereo mode, an electronic device 402 may transmit sound output to a lead sound device 400. The lead sound device 400 delivers the sound output to a user of the lead sound device via one or more speakers of the lead sound device. In addition, the lead sound device 400 transmits the sound output to a follower sound device 404, and the follower sound device delivers the sound output to a user of the follower sound device.

As illustrated by FIG. 4B, while operating in stereo mode, two earpieces may not have a lead/follower relationship. Each lead sound device 406, 408 communicates with an electronic device 410. The electronic device 410 may transmit to one or more of the lead sound devices 406, 408 firmware or firmware updates, sound input, control lines and/or other information. One or more of the lead sound devices 406, 408 may send to the electronic device 410 charging or battery level data, sound output received from one or more microphones, one or more acknowledgements and/or other information. One or more of the lead sound devices 406, 408 deliver the sound output to a user of the lead sound device via one or more speakers of the lead sound device. As shown in FIG. 4B, a charger 414 may be used to charge the battery of one or more of the earpieces 406, 408.

In various embodiments, a sound device may be used to provide sound output to a user, but also to capture sound input. Sound input may include voice or speech data, such as one or more words, phrases, sentences or other sounds spoken or emitted by a user. For example, a user may be conversing with one or more individuals. The user's speech may be captured by a sound device as sound input. Sound input may include sounds made in proximity to a user, such as, for example, ambient or surrounding sounds.

Figure 5:
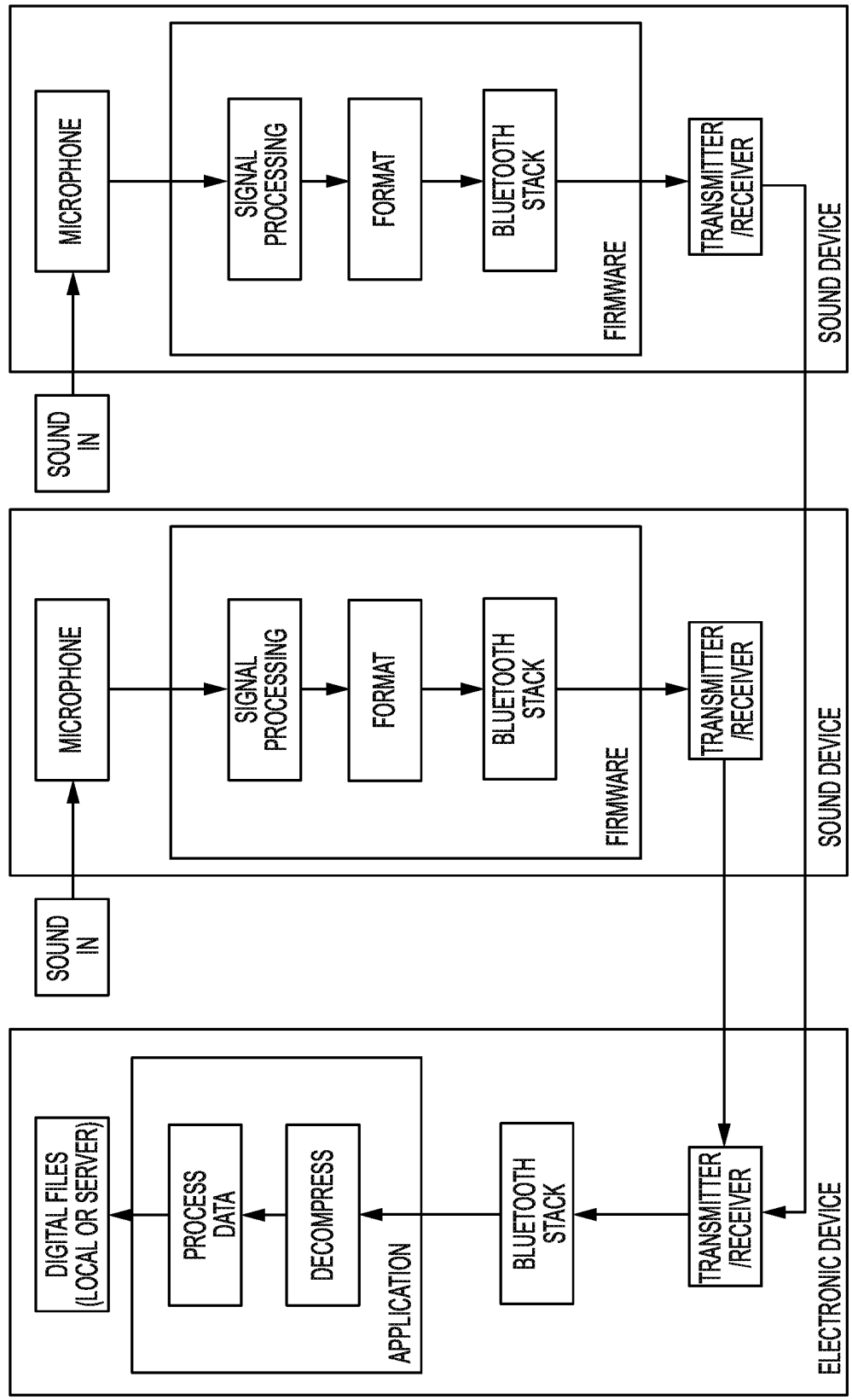
FIG. 5 illustrates a diagram showing an example system for processing sound input according to an embodiment.

FIG. 5 illustrates a diagram showing an example system for processing sound input according to an embodiment. FIG. 5 shows the interaction of two sound devices with an electronic device. Although FIG. 5 shows two sound devices, additional sound devices may be used in similar manner within the scope of this disclosure. In an embodiment, the sound devices illustrated in FIG. 5 may be a pair of earpieces that may be worn by the same user or by different users. For instance, a first user may wear one earpiece of the pair while a second user may wear the other earpiece of the pair.

As shown in FIG. 5A, sound input may be captured by one or more microphones of a sound device. The one or more microphones may provide the captured sound input to one or more hardware and/or firmware components of the sound device. For instance, a microphone may provide the captured sound input to a signal processor. A signal processor may be a microcontroller. For instance, as an example, a signal processor may be a digital signal processor (DSP).

Figure 6:
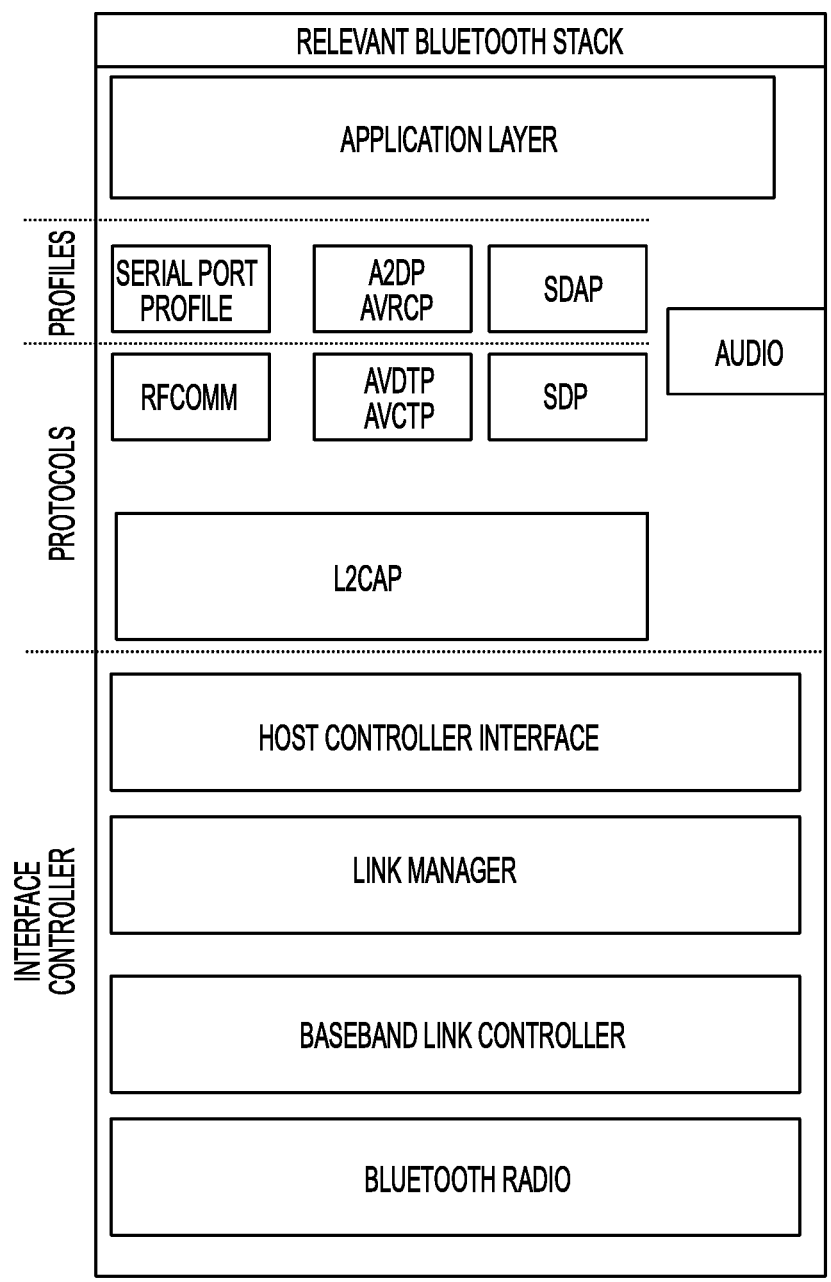
FIG. 6 illustrates an example Bluetooth stack according to an embodiment.

A signal processor may process raw data from a sound input device, such as a microphone. For example, a signal processor may filter and process raw data for best voice usage. A signal processor may convert or compress at least a portion of the sound input to a particular format. For instance, a signal processor may encode and/or compress data for transmission. Formats can either be lossy or lossless. Example formats include, without limitation, Opus, PCM, mp3, wav, flac and/or the like. In various embodiments, part of the signal processing and/or conversion may include compressing and packaging the data into a transmission format such as serial format. This may avoid restrictions imposed by the Bluetooth audio transmission protocol. The formatted sound input may be provided to a Bluetooth stack, and then to a transmitter of the earpiece, such as, for example, a Bluetooth antenna or wireless transmitter. FIG. 6 illustrates an example Bluetooth stack according to an embodiment.

Via the transmitter, a sound device transmits the formatted (e.g., compressed and encoded) sound input to an electronic device. The electronic device receives the formatted sound input via a receiver, such as, for example, a Bluetooth antenna or wireless receiver, and provides the formatted data to a Bluetooth stack of the electronic device. The electronic device may decompress and/or decode the formatted sound input and perform one or more processing steps on the formatted sound input. Example processing steps may include, without limitation, encoding to a different format, partitioning or multiplexing data, changing sample rate, changing bit rate and/or the like.

The processed sound input may then be stored as one or more digital files. The processed sound input may be stored locally on an electronic device as one or more digital files. Alternatively, an electronic device may transmit one or more digital files corresponding to the processed sound input to a different electronic device, such as a server. An electronic device may transmit one or more digital files via a communication network such as, for example, a local area network (LAN), a wide area network (WAN), a mobile or cellular communication network, an extranet, an intranet, the Internet and/or the like.

Figure 7A:
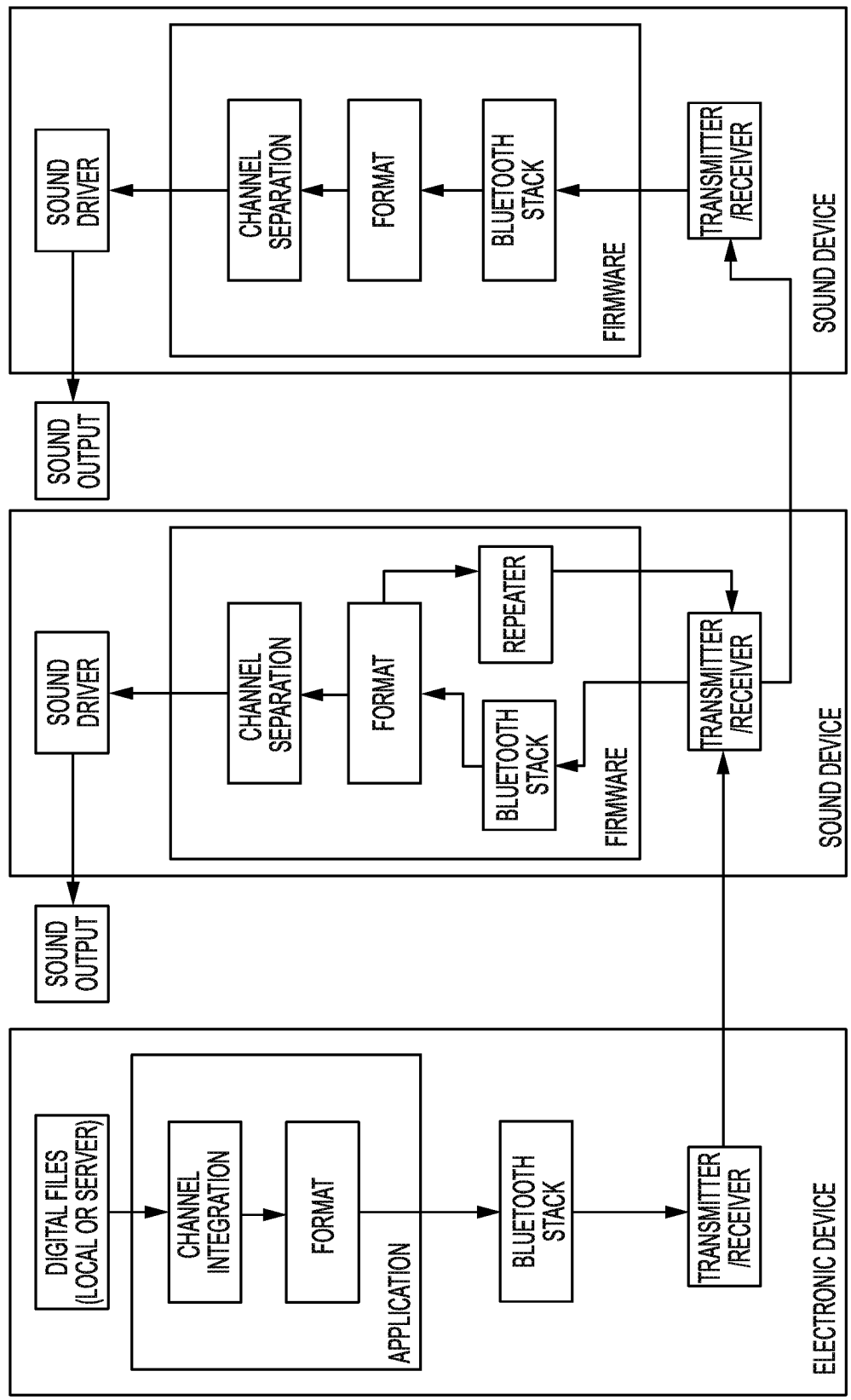
FIGS. 7A and 7B illustrate diagrams showing an example system for processing sound output according to various embodiments.

FIG. 7A illustrates a diagram showing an example system for processing sound output according to an embodiment. FIG. 7A shows the interaction of two sound devices with an electronic device. Although FIG. 7A shows two sound devices, additional sound devices may be used in a similar manner within the scope of this disclosure.

As shown by FIG. 7A, a sound device may obtain one or more digital files of sound output. An electronic device may obtain one or more digital files that are stored locally on the electronic device, or the electronic device may receive one or more digital files from another electronic device, such as a server.

The electronic device may process the digital files. For instance, the electronic device may perform channel integration and/or data formatting on the digital files. With respect to channel integration, the electronic device may determine which digital files, or portions thereof, should be separated or combined based on which sound device(s) it is intended.

With respect to data formatting, an electronic device may convert one or more digital files into a format that can be sent to one or more electronic devices, such as, for example, sound devices, earpieces and/or the like. For instance, formats can either be lossy or lossless. Example formats include, without limitation, Opus, PCM, mp3, wav, flac and/or the like. For example, an electronic device may compress and/or encode one or more digital files.

The processed digital files may be provided to a Bluetooth stack, and then to a transmitter of the electronic device. The electronic device may transmit one or more of the processed digital files and/or a portion of the processed digital files to one or more sound devices.

A receiver, such as a Bluetooth antenna of a sound device, receives the transmitted digital files. The sound device may process the received digital files. The firmware of a sound device may format the digital files. For instance, a sound device may decode and/or decompress the digital files. The firmware of a sound device may determine which received digital files or portion(s) of the received digital files are intended for the sound device. In certain embodiments, only a portion of the received digital files may be intended for one sound device. The remaining portion may be intended for one or more other sound devices.

This may be the case when the system operates for purposes of language translation. As described in more detail below, when operating as a language translator in solo translation mode, one individual may use one earpiece of a set (e.g., the left earpiece), while another individual may use the other earpiece in the set (e.g., the right earpiece). Both earpieces may be associated with the same electronic device. If the first individual's native language is English and the second individual's native language is Spanish, the first individual's earpiece will emit the English translation of the Spanish sound input, while the second individual's earpiece will emit the Spanish translation of the English sound input.

In another embodiment, when operating in solo translation mode, one individual possesses two earpieces, such as two earpieces in a set. Both earpieces may be associated with the same electronic device. In this situation, a user may speak in one language and hear the translation in one of the earpieces. This may be useful for language learning or other circumstances.

FIG. 7A illustrates a system which transmits digital files to sound devices in a chained fashion. For instance, as shown in FIG. 7A, an electronic device transmits digital files to a first sound device. The first sound device, in turn, transmits the digital files to a second sound device, and so on. Each sound device retrieves the relevant portion of the digital files for it.

Figure 7B:
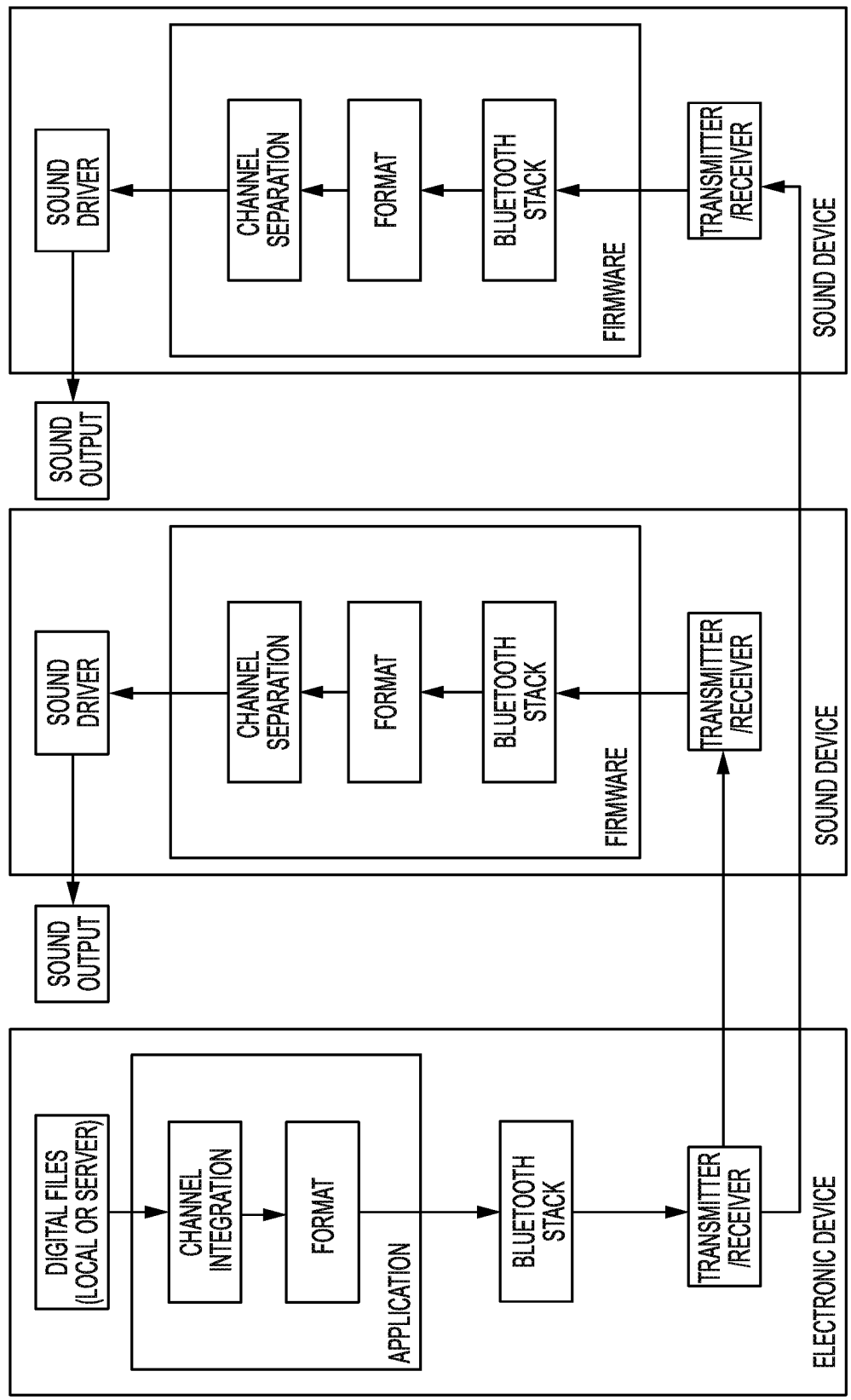

FIG. 7B illustrates a system in which an electronic device transmits digital files directly to each sound device without using one or more sound devices as intermediaries.

Referring to either FIG. 7A or 7B, a sound device may determine which received digital files or portion(s) of the received digital files are intended for the sound device. The digital files may include an indicator which identifies to which sound device the digital files, or portion thereof, is intended to be delivered. For example, an indicator may identify whether a digital file is to be delivered and output to a left earpiece or a right earpiece.

A printed circuit board of a sound device may include an input/output pin that is either tied to ground or floating. A SoC of a sound device reads this input/output pin to determine and identify the sound device. The firmware may determine which digital files or portion thereof is intended for the sound device, and may release such digital files to the sound device. Although this example discusses a left and right earpiece, it is understood that this approach may be extrapolated to multiple input/output pins to create a binary reading and unique indicator for any number of sound devices.

As illustrated by both FIG. 7A and FIG. 7B, a sound device may output one or more of the digital files to a user via one or more speakers.

The following provides an example of solo translation mode according to an embodiment. Sophie is a native French speaker who would like to have a conversation with Mateo, a native Spanish speaker. Sophie possesses a set of earpieces, a left earpiece and a right earpiece. She also has a mobile phone on which is installed a language translator application that is in communication with the right and left earpiece. She keeps the right earpiece to use and gives the left earpiece to Mateo to use.

Sophie begins the conversation by speaking, in French, while wearing her earpiece that is turned on and active. Sophie indicates that her native language is French and that the other participant in the conversation speaks Spanish (origin language is French and target language is Spanish). Alternatively, Sophie's native language may be set as a default setting that does not need to be confirmed.

In various embodiments, Sophie may indicate her preferences, such as native language and target language via one or more user interfaces of her mobile device. Alternatively, she may press a button or sensor of her earpiece, or issue a voice command, such as, for example, "native language French". Alternatively, an electronic device may automatically determine one or more preferences. For example, an electronic device may automatically detect from words or phrases used, inflection, pronunciation and/or the like that a spoken language is a native language.

The microphone of her earpiece captures her speech as sound input, and sends the sound input to her mobile phone in a manner similar to that described above. The mobile phone receives the sound input, and initiates translation of the sound input into Spanish. In an embodiment, the mobile phone may include a language package that is locally stored on the mobile phone, so the mobile phone may perform the translation. Alternatively, the mobile phone may send the sound input to one or more servers for translation. As another alternative, a sound device may perform at least a portion of the translation. For instance, memory of an earpiece may store a language package that it uses to perform translation.

An electronic device that performs a translation (e.g., a mobile device, a server or a sound device) uses one or more configurable settings to perform the translation. For instance, the electronic device may receive an indication of the origin language and the target language. The electronic device may also receive an indication of whether certain sound input corresponds to the origin language or the target language so the electronic device understands which translation is to be performed.

Figure 8:
FIG. 8 illustrates an example process of translating sound input according to an embodiment.

FIG. 8 illustrates an example process of translating sound input according to an embodiment. As illustrated by FIG. 8, at least a portion of sound input may be provided as input to one or more translation algorithms. An electronic device (such as a mobile device, a sound device, a remote server, a local server and/or the like) may apply one or more translation algorithms to the sound input to generate one or more translations. In various embodiments, the sound input and/or the translations may be one or more audio digital files.

In an embodiment, an electronic device may extract from received sound input one or more words, terms or phrases. The electronic device may access a language repository. A language repository may be stored locally on an electronic device, or it may reside remotely from the electronic device, such as on a remote server. A language repository refers to a data store of words, terms and phrases in one language, and their corresponding translations to one or more other languages. An electronic device may access a language repository that includes information pertaining to the language corresponding to the extracted sound input. The electronic device may search the repository for one or more of the extracted words, terms or phrases, and obtain a translation of such data to the target language. The electronic device may create one or more digital audio files comprising a translation of the extracted sound input in the target language. For instance, a translation of a word from an origin language to a target language may include one or more audio files of the word being spoken in the target language. Once an electronic device has identified a particular translation for a certain word, phrase or other term, the electronic device may obtain an audio file corresponding to that word, phrase or other term. The electronic device may create a full translation by compiling audio files corresponding to each of the words, terms or phrases that are extracted from received sound input and combining them to create a single audio file of the complete translation.

As an example, sound input may include one or more digital audio files comprising the phrase "I love you." An electronic device may extract from these audio files the words "I", "love" and "you". The electronic device may know that the origin language for this sound input is English and the target language is Spanish, so it searches a language repository for the Spanish translations for this phrase. It locates two translations, one for "I love" ("amo") and one for "you" ("te"). The electronic device retrieves from a data store one or more audio files corresponding to "amo" and "te" (e.g., audio files of these words being spoken in Spanish), and combines these audio files to generate an audio file for the full translation. Alternatively, an electronic device may retrieve from a data store one or more audio files corresponding to the full translation if available. A data store may be a part of or accessible by an electronic device such as, for example, a mobile device, an earpiece, a local server or a remote server.

Figure 9:
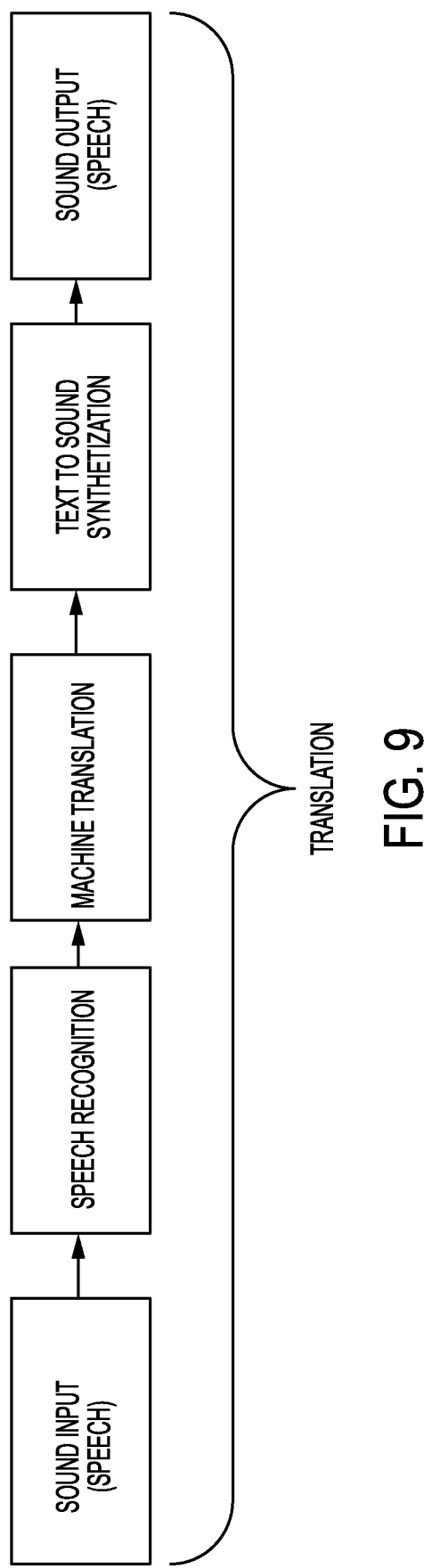
FIG. 9 illustrates an example process of translating sound input according to an embodiment.

In various embodiments, an electronic device may perform translation by converting at least a portion of sound input to text. FIG. 9 illustrates an example process of translating sound input according to an embodiment. As illustrated by FIG. 9, sound input may be provided to an automatic speech recognition system, which may apply one or more automatic speech recognition algorithms to at least a portion of the sound input. The result is a readable text version of at least a portion of the sound input. It is understood that, for the purposes of this disclosure, translation or any portion of the translation process described in this disclosure may be performed by one or more electronic devices. For instance, a mobile phone, a mobile electronic device, a sound device, a server (remote or cloud-based) or any other electronic device may perform translation or a portion thereof.

At least a portion of the readable text may be displayed to a user via a graphical user interface of an electronic device. For instance, a translation application on a user's mobile phone may display at least a portion of the user's sound input as readable text via the phone's user interface. The readable text may be displayed to a user as the user is speaking or soon after the user finishes speaking. Accordingly, the user may verify the accuracy of the automatic speech recognition. In certain embodiments, the user may be able to correct or otherwise modify the readable text via the graphical user interface. For instance, a user may select one or more characters, words and/or phrases of the readable text, and replace them with one or more other characters, words and/or phrases. A user may select from a list of possible corrections, or the user may input a specific correction, such as by using a touch screen, a keyboard and/or the like. If a user corrects readable text, the corrected version may be used as input for translation.

The readable text may be provided as input to a machine translation system. A machine translation system may translate at least a portion of the readable text to a different language.

In an embodiment, a machine translation system may use statistical machine translation (SMT), neural machine translation (NMT), or a combination of SMT and NMT to translate readable text. Additional and/or alternate machine translations may be used within the scope of this disclosure. The translation may be converted from readable text to sound output, and may be provided to a user.

Referring back to the above example, Sophie's mobile phone receives the translated sound input, for example from a language translation application on the mobile phone or from a server. Her mobile phone sends the translated sound input to Mateo's earpiece, either directly or indirectly via Sophie's earpiece as described above. Mateo's earpiece receives the translated sound input and outputs the translation via one or more speakers of Mateo's earpiece.

In various embodiments, the translation may be output to the sound device of the user who provided the corresponding sound input. For instance, with respect to the above example, the translation of Sophie's speech may be output to Sophie's earpiece in Spanish. As such, Sophie may have the ability to hear how her French speech is translated. This may be beneficial for those who are bilingual.

Mateo listens to the translation and speaks his response in Spanish. The microphone of his earpiece captures his speech as sound input, and sends the sound input to Sophie's mobile device. The mobile phone receives the sound input, and initiates translation of the sound input into French. Sophie's mobile phone receives the translated sound input, and sends the translated sound input to Sophie's earpiece. Sophie's earpiece receives the translated sound input and plays the translation via one or more speakers of Sophie's earpiece. This back-and-forth process may be repeated throughout the duration of the conversation between Sophie and Mateo.

In another example, Mateo may have a language translation application on his electronic device (such as his mobile phone). But Mateo may not have earpieces. Sophie provides Mateo with an earpiece to use, while she uses a different earpiece. Sophie's electronic device and Mateo's mobile devices may establish communication with one another. For instance, Sophie and/or Mateo may provide an identifier associated with the other to their electronic device in order to initiate communication between the two devices. Alternatively, the electronic devices may establish communication with one another such as, for example, using near field communication. Once in communication, the devices may facilitate translation of the conversation between Sophie and Mateo.

In various embodiments, two or more sound devices may operate in a push-to-talk mode. Push-to-talk mode may be used during language translation or other uses. In push-to-talk mode, a user who is speaking may provide input to a sound device. This input may indicate to the sound device that the user would like to speak and/or that the user has finished speaking.

A user may provide input to a sound device by pressing a button or otherwise engaging a mechanism of the sound device. For instance, a sound device may include a sensor. By pressing, depressing or otherwise engaging the sensor, the user may indicate to the sound device that the user would like to speak or is done speaking. For instance, when a user would like to speak, the user may engage a sensor, and when the user is finished speaking, the user may again engage the sensor. As another example, when a user would like to speak, the user may engage a sensor (such as pushing a button), and when the user is finished speaking, the user may disengage the sensor (such as releasing a button). Alternatively, a user may indicate to the earpiece that the user is done speaking by issuing one or more voice commands, such as, for example "translate" or "over." Additional and/or alternate commands may be used within the scope of this disclosure.

As another embodiment, a sound device may include an accelerometer. A user may tap on the sound device or may nod, tile or shake his or her head to engage the accelerometer. Doing so may indicate to the sound device that the user has finished speaking and that no additional sound input should be captured by the sound device.

The sound device receives this indication and, in response, sends the sound input that is received prior to receipt of the indication to an electronic device for translation.

In addition, in response to receiving an indication, one or more microphones of a sound device may be deactivated such that sound input is not captured by such microphones, and the microphones of another sound device may be activated. In response to receiving sound input from a sound device, an electronic device may send one or more instructions to another sound device to activate one or more microphones of the other earpiece. These instructions may be sent to directly to the particular sound device or via one or more other sound devices.

For instance, referring to the above example, Sophie may press a button on her earpiece indicating that she is finished speaking. After which, the microphone of her earpiece may not capture sound input even if Sophie continues to speak. Also, in response to her pressing the button, the microphone(s) of Mateo's earpiece may be activated so "control" passes to Mateo to respond to Sophie. Once Mateo is finished speaking, he may press a button on his earpiece indicating that he is finished speaking. After which, the microphone of his earpiece may not capture sound input even if Mateo continues to speak. In response to him pressing the button, the microphone(s) of Sophie's earpiece may be activated so "control" passes to Sophie to respond to Mateo. This process may be repeated throughout their conversation.

In an embodiment, a sensor of a sound device may be used for pause functionality. For instance, if a sensor is a button, depressing the button may cause one or more microphones of a sound device to stop receiving sound input for a period of time. Pressing the button again may cause the one or more microphones to receive sound input. As such, a user may pause the sound capturing functionality of a sound device if the user does not want a certain portion of the user's speech to be translated.

Although the above examples describes communication between two earpiece users, the system described in this disclosure may be used to facilitate group conversations (e.g., conversations between/amongst more than two people).

Figure 10:
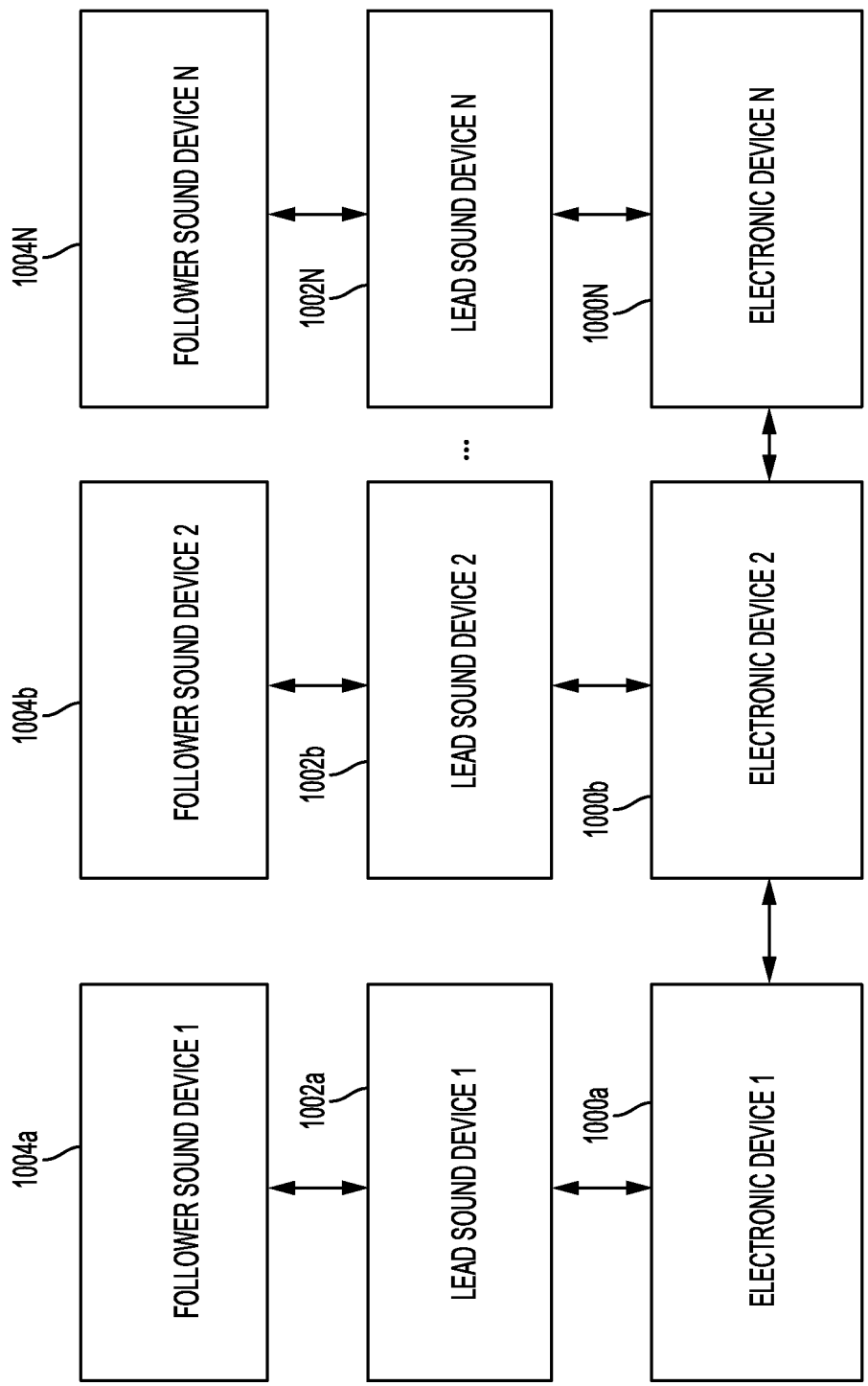
FIG. 10 illustrates an example diagram of a system that facilitates group conversations according to an embodiment.

FIG. 10 illustrates an example diagram of a system that facilitates group conversations according to an embodiment. FIG. 10 shows electronic devices 1000a-N. Each electronic device 1000a-N is associated with a lead sound device 1002a-N and a follower sound device 1004a-N. The electronic devices 1000a-N may have a language translation application installed on each. As an example, this system configuration may be used when two or more individuals who each have their own sound device(s), such as a set of earpieces, and a translation application on their electronic devices (e.g., mobile phones) meet and would like to have a conversation.

In an embodiment, one or more of the electronic devices 1000a-N of FIG. 10 may be in communication with one or more servers. A user of an electronic device may, via a language translation application of the electronic device, specify the participants in a group conversation. For example, a user may provide the application with a unique identifier associated with each of the participants of the group conversation, such as, for example, a username or other identifier. The server may receive the unique identifiers, and may map them to an Internet protocol (IP) address or UUID for each identified participant. For instance, each participant may be registered with a service corresponding to the language translation application, so the server may be able to ascertain a participant's IP address from the participant's unique identifier. The server may also have access to each participant's language settings, including, without limitation, origin or native language. For example, the server may maintain a data store of user settings. The data store may store one or more preferences, settings or other information associated with a user that the user provides or authorizes use of. For example, when a user registers with a service, the user may specify a native language, one or more other spoken languages, user device information and/or the like. This information may be stored in a data store, which the server may reference to facilitate translation, group conversations or other interactions.

As an example, a group conversation may include Jeff, a native English speaker, and Sophie and Mateo from the above example. Each has their own mobile device with the same language translation application, and each has one or more earpieces. For instance, each may have their own set, or they may be sharing earpieces of one or more sets. To initiate the conversation, Sophie logs into the language translation application via her mobile device and initiates a group conversation by providing the application with unique identifiers associated with Jeff and Mateo.

Sophie begins the conversation and one or more of her earpieces capture her speech via one or more microphones. The captured sound input is sent to her mobile device which may perform translation or relay the captured sound input to the server for translation. The server receives the captured sound input and proceeds with translating it to both English (for Jeff) and Spanish (for Mateo). The server then sends sound output of the English translation to Jeff's mobile device, which relays it to one or more of his earpieces, which in turn play the sound output for Jeff. The server also sends sound output of the Spanish translation to Mateo's mobile device, which relays it to one or more of his earpieces, which in turn play the sound output for Mateo. In various embodiments, push-to-talk, as described above, may be used to facilitate this communication.

In various embodiments, a system may support one-way translation functionality for a user of a sound device. In this situation, a user may use one or more sound devices. But an individual they are speaking to does not possess a sound device or other translation device. For example, Sophie may want to translate what Wen, a native Chinese speaker, is saying. However, Wen may not possess an earpiece or language translation application. Sophie's earpiece may include one or more far field microphones that capture Wen's speech when he speaks in proximity to Sophie. This sound input is sent to Sophie's mobile phone. The sound input is translated (as described throughout this disclosure) to French, and the translation is provided to and output by Sophie's earpiece.

In an embodiment, Sophie may respond and one or more microphones of one or more of her earpieces may capture her speech. This audio input may be provided to her mobile device and translated to Chinese. Sophie's mobile device may output the translation via one or more speakers of her mobile device. As such, even though Wen does not possess an earpiece or language translator, he may still hear Sophie's translated response.

In another embodiment, an earpiece user may have a conversation with another individual having an electronic device that is not an earpiece. In this situation, an electronic device of one individual may recognize an electronic device of another individual with whom a conversation is to be had. For instance, one or more of the individuals may identify the other individual that is part of the conversation such as, for example, by providing an identifier associated with the other individual to their electronic device. Alternatively, the electronic devices may establish communication with one another such as, for example, using far field communication.

Referring back to the example above, Wen may have a mobile device with a language translation application, and may use this device to communicate with Sophie. Sophie may use her mobile device and one or more earpieces. Wen's mobile phone and Sophie's mobile phone may recognize one another, and a conversation between the two individuals may be initiated. One or more microphones of Wen's mobile phone may capture his speech, and may send the speech to a server or to Sophie's mobile phone, where it is translated to French. The server and/or Sophie's mobile phone may transmit digital files of the translation to one or more Sophie's earpieces, which may emit the translation to Sophie. When Sophie responds, her speech may be captured by one or more microphones of her earpiece(s), and transmitted to her mobile phone and/or a server, where it is translated to Chinese. This translation is transmitted from the server and/or Sophie's mobile phone to Wen's mobile phone, which may emit the translation to Wen.

Figure 11A:
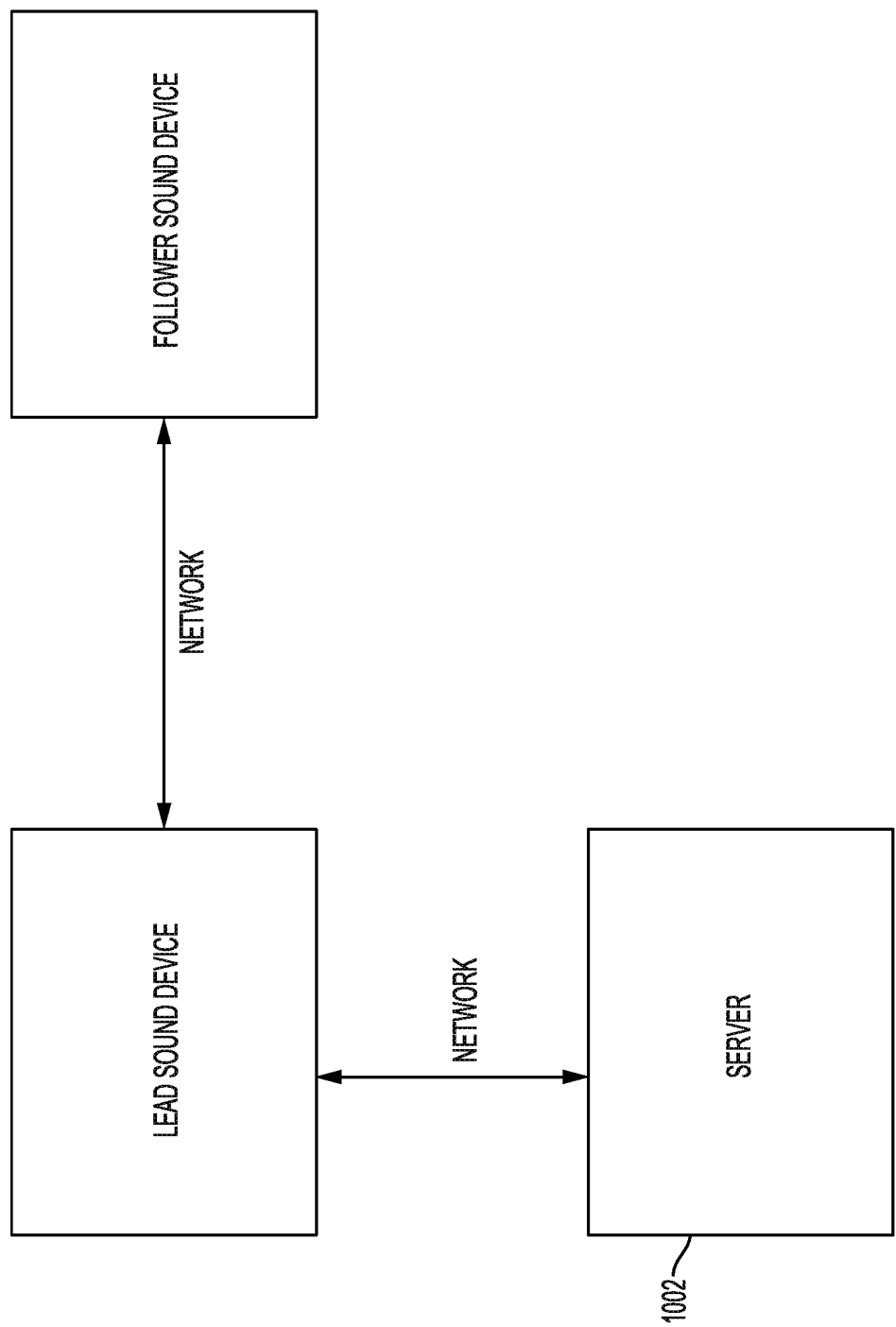
FIGS. 11A and 11B illustrate various system configurations according to various embodiments.
Figure 11B:
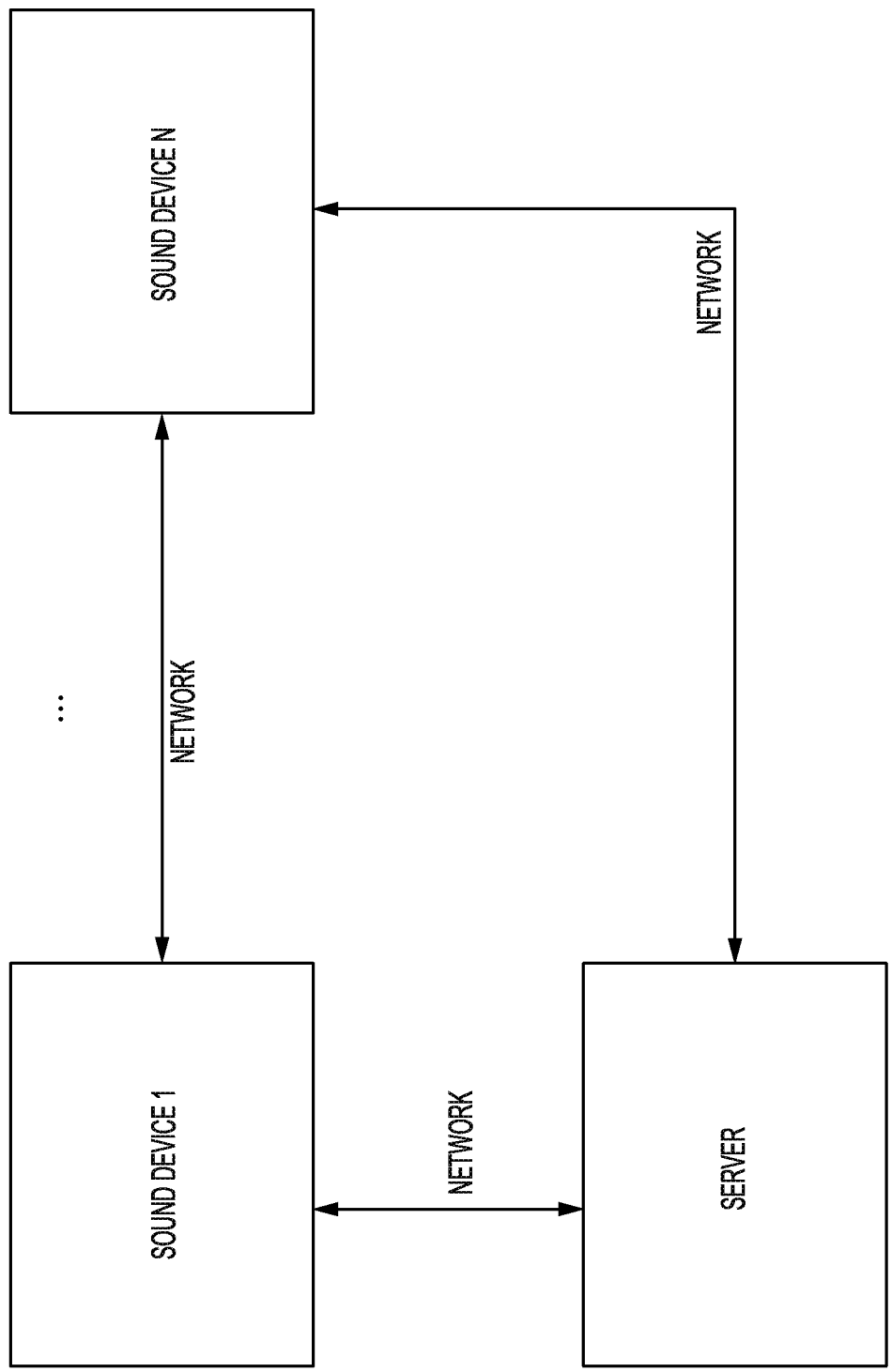

FIGS. 11A and 11B illustrate systems where one or more sound devices communicate directly with one or more servers. Rather than communicating indirectly with one or more servers via an electronic device, such as for example, a mobile phone, one or more sound devices may communicate directly with one or more servers (and one or more servers communicate directly with one or more sound devices) via a communication network. A sound device may include a Wi-Fi or GSM chip which allows it to wirelessly communicate with one or more servers over a network. The one or more servers may perform one or more translations for a sound device in a manner similar to that described throughout this disclosure. FIG. 11A illustrates a lead-follower earpiece configuration, and FIG. 11B illustrates a configuration where a server communicates directly with the sound devices.

In various embodiments, for any uses, whether solo mode, group translation or a different user, a language translation application may display a written transcript of a conversation on a graphical user interface of an electronic device. The written transcript may be displayed in a user's native language. As such, a user may be able to follow along with a written transcription of a conversation in addition to hearing the conversation in his or her native language via one or more earpieces. The transcript may be stored on the electronic device on which the language translation application resides. Or it may be stored on a different electronic device, such as a remote server. In certain embodiments, the transcript may be stored after the conversation has ended. In other embodiments, the transcript may be deleted after the conversation has ended.

Although various embodiments are described throughout this disclosure as utilizing one or more earpieces, it is understood that alternate electronic devices, such as, for example, mobile phones, sensors, headless devices, storage devices, and/or the like may be used instead of or in addition to the earpieces as described throughout this disclosure.

Figure 13A:
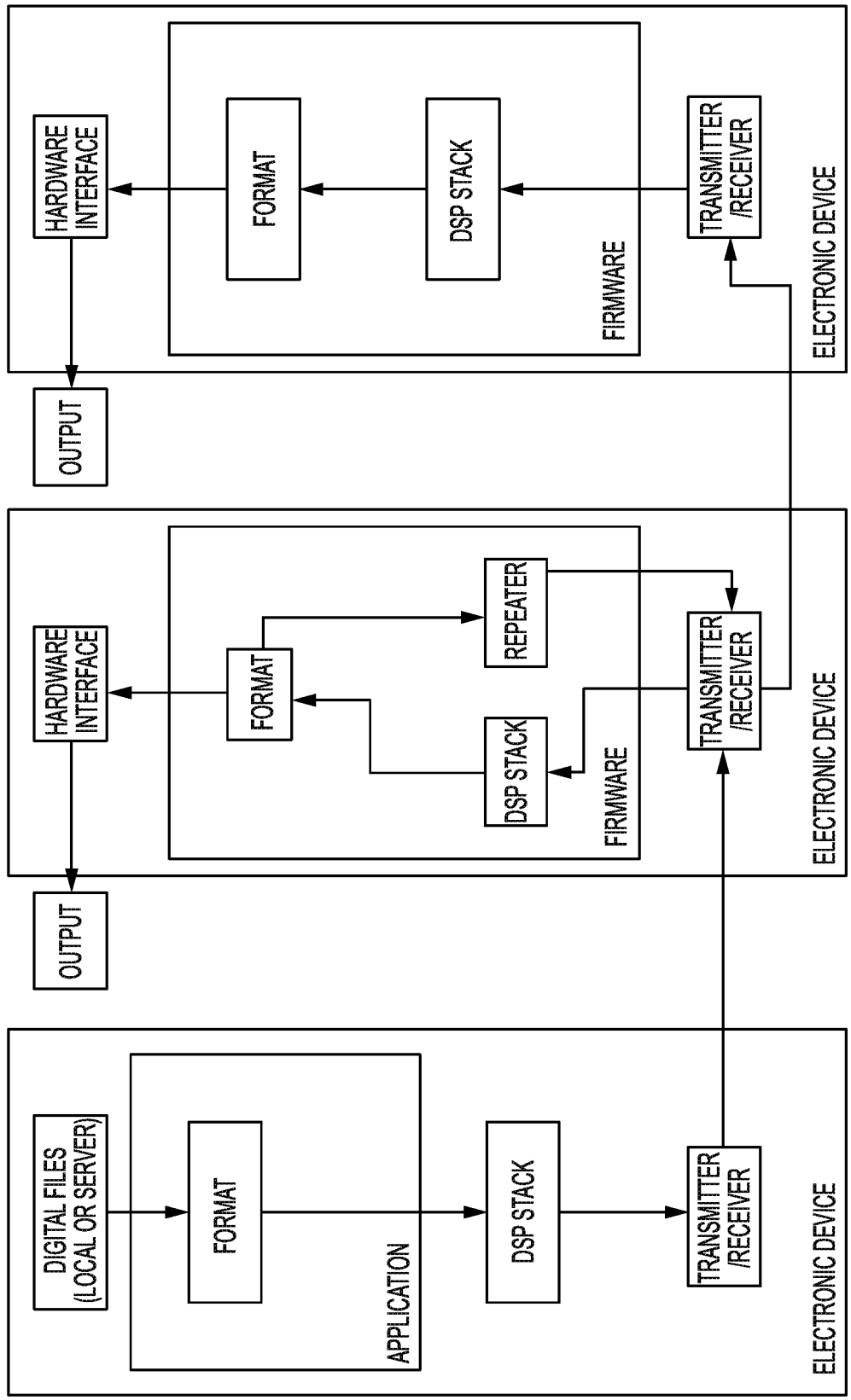
FIGS. 13A and 13B illustrate example systems for processing digital data according to various embodiments.
Figure 13B:
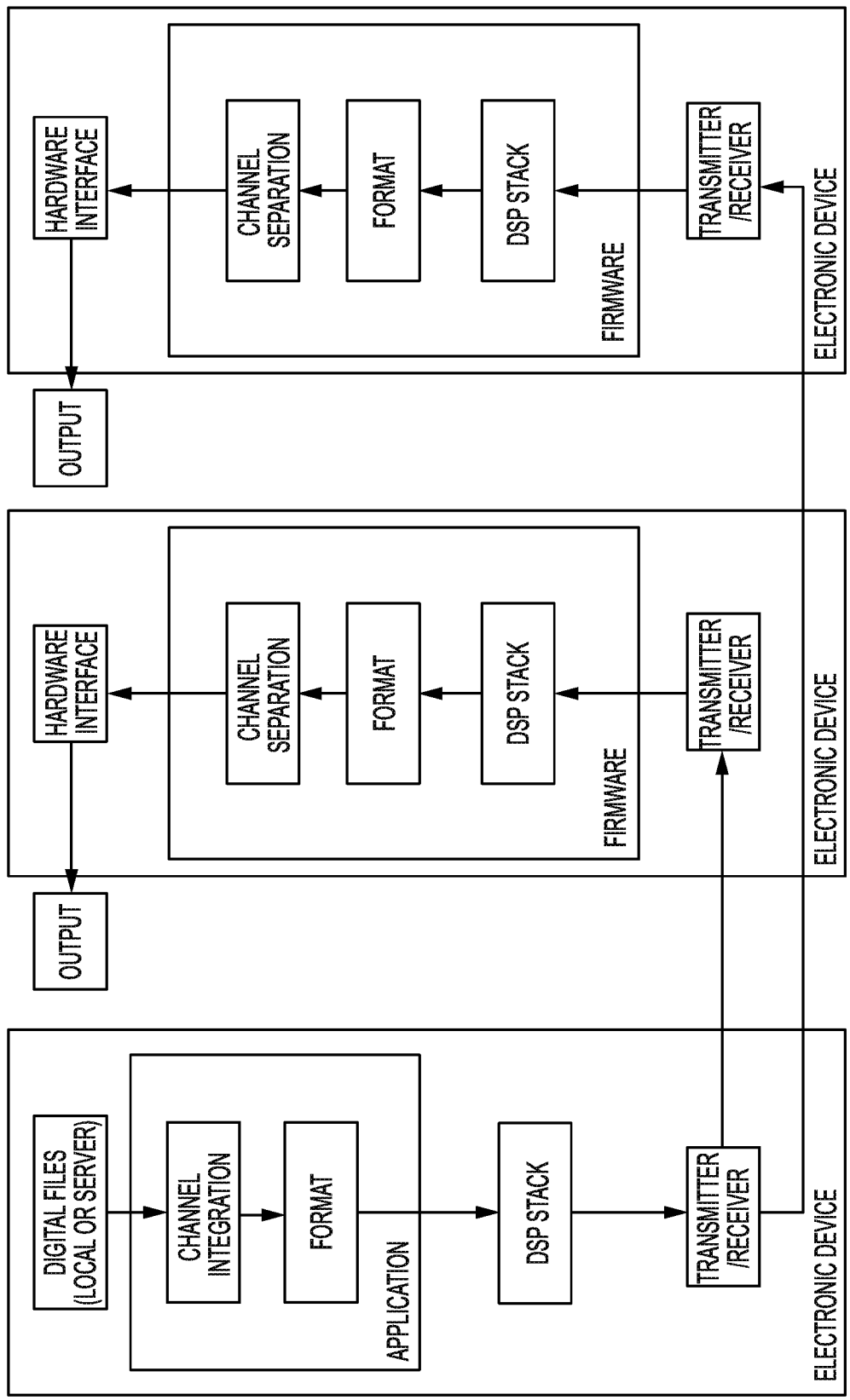

In addition, although the disclosure discusses the transmission and receipt of audio content, the described systems can be used to transmit, receive and process digital data, such as, for example, video or other visual content and/or the like. FIG. 13A and FIG. 13B illustrates example systems for processing digital data according to various embodiments.

Figure 12:
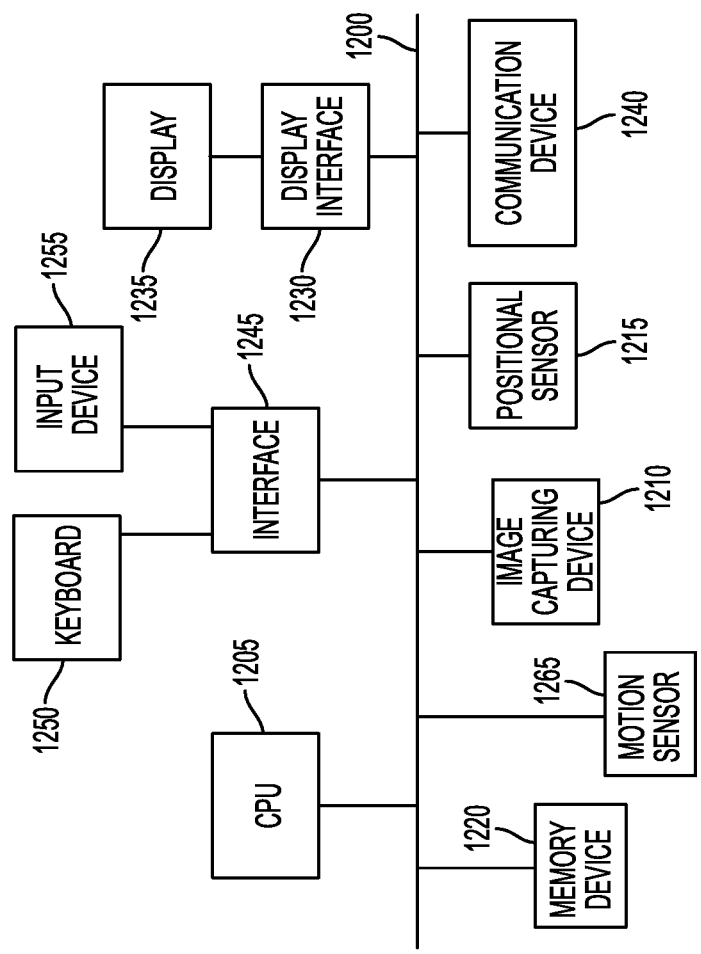
FIG. 12 illustrates a block diagram of example hardware that may be used to contain or implement program instructions according to an embodiment.

FIG. 12 depicts a block diagram of hardware that may be used to contain or implement program instructions, such as those of a cloud-based server, electronic device, virtual machine, or container. A bus 1200 serves as an information highway interconnecting the other illustrated components of the hardware. The bus may be a physical connection between elements of the system, or a wired or wireless communication system via which various elements of the system share data. Processor 1205 is a processing device that performs calculations and logic operations required to execute a program. Processor 1205, alone or in conjunction with one or more of the other elements disclosed in FIG. 12, is an example of an electronic device, processing device, computing device or processor as such terms are used within this disclosure. The processing device may be a physical processing device, a virtual device contained within another processing device, or a container included within a processing device. A processing device may be a microprocessor or microcontroller.

A memory device 1220 is a hardware element or segment of a hardware element on which programming instructions, data, or both may be stored. Read only memory (ROM) and random access memory (RAM) constitute examples of memory devices, along with cloud storage services, and flash memory.

An optional display interface 1230 may permit information to be displayed on the display 1235 in audio, visual, graphic or alphanumeric format. Communication with external devices, such as a printing device, may occur using various communication devices 1240, such as a communication port or antenna. A communication device 1240 may be communicatively connected to a communication network, such as the Internet or an intranet.

The hardware may also include a user input interface 1245 which allows for receipt of data from input devices such as a keyboard or keypad 1250, or other input device 1255 such as a mouse, a touch pad, a touch screen, a remote control, a pointing device, a video input device and/or a microphone. Data also may be received from an image capturing device 1210 such as a digital camera or video camera. A positional sensor 1215 and/or motion sensor 1265 may be included to detect position and movement of the device. Examples of motion sensors 1065 include gyroscopes or accelerometers. An example of a positional sensor 1215 is a global positioning system (GPS) sensor device that receives positional data from an external GPS network. The hardware may also include output devices, such as, for example one or more speakers.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system comprising:
a plurality of sound devices;
an electronic device comprising a serial port emulator configured to:
modify a logical link control and adaptation protocol (L2CAP) to generate a Bluetooth serial port emulation corresponding to each of the plurality of sound devices, and
route data to a radio frequency communication (RF-COMM) protocol that sits on top of the L2CAP,
and
a computer-readable storage medium comprising one or more programming instructions that, when executed, cause the electronic device to:
receive, via a receiver of the electronic device, compressed and encoded sound input from a first sound device via a serial port emulation associated with the first sound device, wherein the first sound device is from the plurality of sound devices, wherein the first sound device is a first wireless earpiece, wherein the sound input is associated with a first language,
decode and decompress the compressed and encoded sound input to generate decompressed and decoded sound input,
generate sound output by translating the decompressed and decoded sound input from the first language to a second language,
compress and encode the sound output to generate compressed and encoded sound output,
route the compressed and encoded sound output to the RFCOMM protocol, and
transmit the compressed and encoded sound output to a second sound device via the Bluetooth serial port emulation associated with the second sound device, wherein the second sound device is a second wireless earpiece.

2. The system of claim 1, wherein at least a portion of the decompressed and decoded sound input is captured by one or more microphones of the first sound device.

3. The system of claim 1, wherein the second sound device is configured to:
receive the compressed and encoded sound output;
decode and decompress the compressed and encoded sound output to generate decompressed and decoded sound output; and
output at least a portion of the decompressed and decoded sound output via one or more speakers of the second sound device.

4. The system of claim 1, wherein the one or more programming instructions that, when executed, cause the electronic device to generate sound output by translating the decompressed and decoded sound input from the first language to the second language comprise one or more programming instructions that, when executed, cause the electronic device to:
send at least the portion of the decompressed and decoded sound input to a remote server for translation; and
receive the sound output from the remote server.

5. The system of claim 1, the one or more programming instructions that, when executed, cause the electronic device to generate sound output by translating the decompressed and decoded sound input from the first language to the second language comprise one or more programming instructions that, when executed, cause the electronic device to:
identify a first setting indicating that a native language is the first language; and
identify a second setting indicating that a target language is the second language,
wherein the first setting and second setting are specified by a user via the electronic device.

6. The system of claim 1, wherein the one or more programming instructions that, when executed, cause the electronic device to transmit the compressed and encoded sound output to a second sound device comprise one or more programming instructions that, when executed, cause the electronic device to transmit the compressed and encoded sound output directly to the second sound device.

7. The system of claim 1, wherein the one or more programming instructions that, when executed, cause the electronic device to transmit the compressed and encoded sound output to a second sound device comprise one or more programming instructions that, when executed, cause the electronic device to transmit the compressed and encoded sound output indirectly to the second sound device via the first sound device.

8. The system of claim 1, wherein the computer-readable storage medium further comprises one or more programming instructions that, when executed, cause the electronic device to:
generate a transcript of one or more of the decompressed and decoded sound input or the sound output, wherein the transcript comprises text representations of the one or more of the decompressed and decoded sound input or the sound output; and
present at least a portion of the transcript via a graphical user interface of the electronic device.

9. The system of claim 1, wherein the computer-readable storage medium further comprises one or more programming instructions that, when executed, cause the electronic device to:
receive, via the Bluetooth serial port emulation associated with the second sound device, compressed and encoded second sound input of the second language;

decode and decompress the compressed and encoded second sound input to generate decompressed and decoded second sound input;

translate at least a portion of the decompressed and decoded second sound input to generate second sound output;

compress and encode the second sound output to generate compressed and encoded second sound output; and transmit, by the transmitter of the electronic device, the compressed and encoded second sound output to the first sound device via the Bluetooth serial port emulation associated with the first sound device for output by the first sound device.

10. The system of claim 1, wherein the first wireless earpiece and the second wireless earpiece are from a set of wireless earpieces, wherein one of the first wireless earpiece or the second wireless earpiece is a left earpiece, and the other of the first wireless earpiece or the second wireless earpiece is a right earpiece.

11. A method, comprising:

modifying, by a serial port emulator of an electronic device, a logical link control and adaptation protocol (L2CAP) to generate a Bluetooth serial port emulation for each of a plurality of sound devices in communication with the electronic device;

receiving, via a receiver of the electronic device, compressed and encoded sound input from a first sound device via a serial port emulation associated with the first sound device, wherein the sound input is associated with a first language, wherein the first sound device is a first wireless earpiece;

decoding and decompressing the compressed and encoded sound input to generate decompressed and decoded sound input;

generating, by the electronic device, sound output by translating the decompressed and decoded sound input from the first language to a second language;

compressing and encoding the sound output to generate compressed and encoded sound output;

routing the compressed and encoded sound output to a radio frequency communication (RFCOMM) protocol that sits on top of the L2CAP, and transmitting the compressed and encoded sound output to a second sound device via the Bluetooth serial port emulation associated with the second sound device, wherein the second sound device is a second wireless earpiece.

12. The method of claim 11, wherein at least a portion of the decompressed and decoded sound input is captured by one or more microphones of the first sound device.

13. The method of claim 11, wherein the second sound device is configured to:

receive the compressed and encoded sound output;

decode and decompress the compressed and encoded sound output to generate decompressed and decoded sound output; and output at least a portion of the decompressed and decoded sound output via one or more speakers of the second sound device.

14. The method of claim 11, wherein generating sound output by translating the decompressed and decoded sound input from the first language to the second language comprises:

sending at least the portion of the decompressed and decoded sound input to a remote server for translation; and receiving the sound output from the remote server.

15. The method of claim 11, wherein generating sound output by translating the decompressed and decoded sound input from the first language to the second language comprises:

identifying a first setting indicating that a native language is the first language; and identifying a second setting indicating that a target language is the second language, wherein the first setting and second setting are specified by a user via the electronic device.

16. The method of claim 11, wherein transmitting the compressed and encoded sound output to a second sound device comprises transmitting the compressed and encoded sound output directly to the second sound device.

17. The method of claim 11, wherein transmitting the compressed and encoded sound output to a second sound device comprises transmitting the compressed and encoded sound output indirectly to the second sound device via the first sound device.

18. The method of claim 11, further comprising:

generating a transcript of one or more of the decompressed and decoded sound input or the sound output, wherein the transcript comprises text representations of the one or more of the sound input or the sound output; and presenting at least a portion of the transcript via a graphical user interface of the electronic device.

19. The method of claim 11, further comprising:

receiving via the Bluetooth serial port emulation associated with the second sound device, compressed and encoded second sound input of the second language;

decoding and decompressing the compressed and encoded second sound input to generate decompressed and decoded second sound input;

translate at least a portion of the decompressed and decoded second sound input to generate second sound output;

compress and encode the second sound output to generate compressed and encoded second sound output; and transmitting the compressed and encoded second sound output to the first sound device via the Bluetooth serial port emulation associated with the first sound device for output by the first sound.

* * * * *